(12) United States Patent
Raji et al.

(10) Patent No.: US 8,335,842 B2
(45) Date of Patent: Dec. 18, 2012

(54) PREMISES MANAGEMENT NETWORKING

(75) Inventors: Reza Raji, Menlo Park, CA (US); Gerald Gutt, Tucson, AZ (US)

(73) Assignee: iControl Networks, Inc., Redwood City, CA (US)

( * ) Notice: Subject to any disclaimer, the term of this patent is extended or adjusted under 35 U.S.C. 154(b) by 926 days.

(21) Appl. No.: 11/084,232

(22) Filed: Mar. 16, 2005

(65) Prior Publication Data

US 2005/0216580 A1 Sep. 29, 2005

Related U.S. Application Data

(60) Provisional application No. 60/553,934, filed on Mar. 16, 2004, provisional application No. 60/553,932, filed on Mar. 16, 2004, provisional application No. 60/652,475, filed on Feb. 11, 2005.

(51) Int. Cl.
*G06F 15/173* (2006.01)

(52) U.S. Cl. ........ 709/223; 709/224; 709/225; 709/217; 709/218; 726/11; 726/12; 715/736; 700/17; 700/19

(58) Field of Classification Search .......... 709/220, 709/223–225, 217–218; 715/736; 370/351; 379/102.01; 726/11–12; 340/3.1, 3.7, 3.71; 700/17, 19
See application file for complete search history.

(56) References Cited

U.S. PATENT DOCUMENTS

| | | | |
|---|---|---|---|
| 4,754,261 A | 6/1988 | Marino | |
| 4,779,007 A | 10/1988 | Schlanger et al. | |
| 4,833,449 A | 5/1989 | Gaffigan | |
| 4,860,185 A | 8/1989 | Brewer et al. | |
| 4,993,059 A | 2/1991 | Smith et al. | |
| 5,086,385 A | 2/1992 | Launey et al. | |
| 5,519,878 A | 5/1996 | Dolin, Jr. | |
| 5,579,197 A | 11/1996 | Mengelt et al. | |
| 5,715,394 A * | 2/1998 | Jabs | 709/223 |
| 5,907,279 A | 5/1999 | Bruins et al. | |
| 5,963,916 A | 10/1999 | Kaplan | |
| D416,910 S | 11/1999 | Vasquez | |
| 5,991,795 A | 11/1999 | Howard et al. | |
| 6,037,991 A | 3/2000 | Thro et al. | |
| 6,052,052 A | 4/2000 | Delmonaco | |
| 6,060,994 A | 5/2000 | Chen | |
| 6,134,591 A | 10/2000 | Nickles | |

(Continued)

FOREIGN PATENT DOCUMENTS

| | | |
|---|---|---|
| JP | 2003/085258 A | 9/2001 |
| JP | 2003-85258 A | 9/2001 |
| JP | 2003-141659 | 10/2001 |
| JP | 2003/141659 | 10/2001 |

(Continued)

OTHER PUBLICATIONS

Examination Report under Section 18(3), dated Aug. 13, 2007 re UK patent application No. GB0620362.4.

(Continued)

*Primary Examiner* — Alina N. Boutah
(74) *Attorney, Agent, or Firm* — Gregory & Sawrie LLP

(57) ABSTRACT

Some embodiments of a method for premises management networking include monitoring premises management devices connected to a gateway at a premises; controlling premises management devices connected to the gateway at the premises; receiving, at the premises, an uplink-initiation signal associated with a network operations center server; and in response to the uplink-initiation signal, initiating, from the gateway at the premises, communications between the gateway and the network operations center server; and communicating, during the communications between the gateway and the network operations center server, information associated with the premises management devices.

25 Claims, 17 Drawing Sheets

U.S. PATENT DOCUMENTS

| | | | |
|---|---|---|---|
| 6,140,987 A | 10/2000 | Stein et al. | |
| 6,198,479 B1 | 3/2001 | Humpleman et al. | |
| 6,219,677 B1 | 4/2001 | Howard | |
| 6,281,790 B1 | 8/2001 | Kimmel et al. | |
| 6,286,038 B1 | 9/2001 | Reichmeyer et al. | |
| 6,288,716 B1 | 9/2001 | Humpleman et al. | |
| D451,529 S | 12/2001 | Vasquez | |
| 6,331,122 B1 | 12/2001 | Wu | |
| 6,351,829 B1 | 2/2002 | Dupont et al. | |
| 6,353,891 B1 | 3/2002 | Borella et al. | |
| 6,363,417 B1 | 3/2002 | Howard et al. | |
| 6,363,422 B1* | 3/2002 | Hunter et al. | 709/224 |
| 6,370,436 B1 | 4/2002 | Howard et al. | |
| 6,377,861 B1 | 4/2002 | York | |
| 6,385,772 B1 | 5/2002 | Courtney | |
| 6,400,265 B1 | 6/2002 | Saylor et al. | |
| D464,328 S | 10/2002 | Vasquez et al. | |
| D464,948 S | 10/2002 | Vasquez et al. | |
| 6,462,507 B2 | 10/2002 | Fisher, Jr. | |
| 6,462,663 B1 | 10/2002 | Wilson et al. | |
| 6,467,084 B1 | 10/2002 | Howard et al. | |
| 6,480,901 B1 | 11/2002 | Weber et al. | |
| 6,493,020 B1 | 12/2002 | Stevenson et al. | |
| 6,496,927 B1 | 12/2002 | McGrane | |
| 6,529,723 B1 | 3/2003 | Bentley | |
| 6,542,075 B2 | 4/2003 | Barker et al. | |
| 6,563,800 B1 | 5/2003 | Salo et al. | |
| 6,574,234 B1 | 6/2003 | Myer et al. | |
| 6,580,950 B1 | 6/2003 | Johnson et al. | |
| 6,587,736 B2 | 7/2003 | Howard et al. | |
| 6,591,094 B1 | 7/2003 | Bentley | |
| 6,601,086 B1 | 7/2003 | Howard et al. | |
| 6,609,127 B1 | 8/2003 | Lee et al. | |
| 6,615,088 B1 | 9/2003 | Myer et al. | |
| 6,621,827 B1 | 9/2003 | Rezvani et al. | |
| 6,636,893 B1* | 10/2003 | Fong | 709/223 |
| 6,643,652 B2 | 11/2003 | Helgeson et al. | |
| 6,643,669 B1 | 11/2003 | Novak et al. | |
| 6,648,682 B1 | 11/2003 | Wu | |
| 6,658,091 B1 | 12/2003 | Naidoo et al. | |
| 6,661,340 B1 | 12/2003 | Saylor et al. | |
| 6,686,838 B1 | 2/2004 | Rezvani et al. | |
| 6,690,411 B2 | 2/2004 | Naidoo et al. | |
| 6,693,545 B2 | 2/2004 | Brown et al. | |
| 6,721,689 B2 | 4/2004 | Markle et al. | |
| 6,721,747 B2 | 4/2004 | Lipkin | |
| 6,738,824 B1 | 5/2004 | Blair | |
| 6,756,998 B1 | 6/2004 | Bilger | |
| 6,778,085 B2 | 8/2004 | Faulkner et al. | |
| 6,781,509 B1 | 8/2004 | Oppedahl et al. | |
| 6,789,147 B1 | 9/2004 | Kessler et al. | |
| 6,795,322 B2 | 9/2004 | Aihara et al. | |
| 6,798,344 B2 | 9/2004 | Faulkner et al. | |
| 6,826,233 B1 | 11/2004 | Oosawa | |
| 6,865,690 B2 | 3/2005 | Kocin | |
| 6,891,838 B1 | 5/2005 | Petite et al. | |
| 6,912,429 B1 | 6/2005 | Bilger | |
| 6,928,148 B2 | 8/2005 | Simon et al. | |
| 6,930,599 B2 | 8/2005 | Naidoo et al. | |
| 6,930,730 B2 | 8/2005 | Maxon et al. | |
| 6,931,445 B2 | 8/2005 | Davis | |
| 6,943,681 B2 | 9/2005 | Rezvani et al. | |
| 6,959,393 B2 | 10/2005 | Hollis et al. | |
| 6,965,313 B1 | 11/2005 | Saylor et al. | |
| 6,970,183 B1 | 11/2005 | Monroe | |
| 6,972,676 B1 | 12/2005 | Kimmel et al. | |
| 6,975,220 B1 | 12/2005 | Foodman et al. | |
| 6,990,591 B1 | 1/2006 | Pearson | |
| 7,016,970 B2 | 3/2006 | Harumoto et al. | |
| 7,020,697 B1* | 3/2006 | Goodman et al. | 709/223 |
| 7,020,701 B1* | 3/2006 | Gelvin et al. | 709/224 |
| 7,024,676 B1 | 4/2006 | Klopfenstein | |
| 7,030,752 B2 | 4/2006 | Tyroler | |
| 7,032,002 B1 | 4/2006 | Rezvani et al. | |
| 7,034,681 B2 | 4/2006 | Yamamoto et al. | |
| 7,039,391 B2 | 5/2006 | Rezvani et al. | |
| 7,047,088 B2 | 5/2006 | Nakamura et al. | |
| 7,047,092 B2 | 5/2006 | Wimsatt | |
| 7,072,934 B2 | 7/2006 | Helgeson et al. | |
| 7,079,020 B2 | 7/2006 | Stilp | |
| 7,080,046 B1 | 7/2006 | Rezvani et al. | |
| 7,085,937 B1 | 8/2006 | Rezvani et al. | |
| 7,099,944 B1 | 8/2006 | Anschutz et al. | |
| 7,103,152 B2 | 9/2006 | Naidoo et al. | |
| 7,106,176 B2 | 9/2006 | La et al. | |
| 7,113,090 B1 | 9/2006 | Saylor et al. | |
| 7,113,099 B2 | 9/2006 | Tyroler et al. | |
| 7,120,232 B2 | 10/2006 | Naidoo et al. | |
| 7,120,233 B2 | 10/2006 | Naidoo et al. | |
| 7,130,383 B2 | 10/2006 | Naidoo et al. | |
| 7,130,585 B1 | 10/2006 | Ollis et al. | |
| 7,148,810 B2* | 12/2006 | Bhat | 340/692 |
| 7,149,798 B2 | 12/2006 | Rezvani et al. | |
| 7,174,564 B1 | 2/2007 | Weatherspoon et al. | |
| 7,183,907 B2 | 2/2007 | Simon et al. | |
| 7,203,486 B2 | 4/2007 | Patel | |
| 7,209,945 B2* | 4/2007 | Hicks et al. | 709/203 |
| 7,218,217 B2 | 5/2007 | Adonailo et al. | |
| 7,222,359 B2 | 5/2007 | Freund et al. | |
| 7,237,267 B2 | 6/2007 | Rayes et al. | |
| 7,250,854 B2 | 7/2007 | Rezvani et al. | |
| 7,254,779 B1 | 8/2007 | Rezvani et al. | |
| 7,262,690 B2 | 8/2007 | Heaton et al. | |
| 7,305,461 B2 | 12/2007 | Ullmann | |
| 7,337,217 B2 | 2/2008 | Wang | |
| 7,337,473 B2 | 2/2008 | Chang et al. | |
| 7,343,619 B2 | 3/2008 | Ofek et al. | |
| 7,349,761 B1 | 3/2008 | Cruse | |
| 7,349,967 B2 | 3/2008 | Wang | |
| 7,367,045 B2 | 4/2008 | Ofek et al. | |
| 7,370,115 B2 | 5/2008 | Bae et al. | |
| 7,383,339 B1 | 6/2008 | Meenan et al. | |
| 7,403,838 B2 | 7/2008 | Deen et al. | |
| 7,409,451 B1 | 8/2008 | Meenan et al. | |
| 7,428,585 B1 | 9/2008 | Owens et al. | |
| 7,430,614 B2 | 9/2008 | Shen et al. | |
| 7,440,434 B2 | 10/2008 | Chaskar et al. | |
| 7,457,869 B2 | 11/2008 | Kernan | |
| 7,469,139 B2 | 12/2008 | van de Groenendaal | |
| 7,469,294 B1 | 12/2008 | Luo et al. | |
| 7,480,713 B2 | 1/2009 | Ullmann | |
| 7,480,724 B2 | 1/2009 | Zimler et al. | |
| 7,506,052 B2 | 3/2009 | Qian et al. | |
| 7,509,687 B2 | 3/2009 | Ofek et al. | |
| 7,526,762 B1 | 4/2009 | Astala et al. | |
| 7,551,071 B2 | 6/2009 | Bennett, III et al. | |
| 7,558,379 B2 | 7/2009 | Winick | |
| 7,577,420 B2 | 8/2009 | Srinivasan et al. | |
| 7,587,464 B2 | 9/2009 | Moorer et al. | |
| 7,627,665 B2 | 12/2009 | Barker et al. | |
| 7,634,519 B2 | 12/2009 | Creamer et al. | |
| 8,140,658 B1* | 3/2012 | Gelvin et al. | 709/224 |
| 2001/0016501 A1 | 8/2001 | King | |
| 2001/0034754 A1 | 10/2001 | Elwahab et al. | |
| 2002/0004828 A1 | 1/2002 | Davis et al. | |
| 2002/0026476 A1 | 2/2002 | Miyazaki et al. | |
| 2002/0029276 A1* | 3/2002 | Bendinelli et al. | 709/227 |
| 2002/0038380 A1 | 3/2002 | Brawn et al. | |
| 2002/0052913 A1 | 5/2002 | Yamada et al. | |
| 2002/0083342 A1 | 6/2002 | Webb et al. | |
| 2002/0095490 A1 | 7/2002 | Barker et al. | |
| 2002/0099809 A1* | 7/2002 | Lee | 709/223 |
| 2002/0103898 A1 | 8/2002 | Moyer et al. | |
| 2002/0103927 A1 | 8/2002 | Parent | |
| 2002/0107910 A1 | 8/2002 | Zhao | |
| 2002/0111698 A1 | 8/2002 | Graziano et al. | |
| 2002/0112051 A1 | 8/2002 | Ullmann | |
| 2002/0112182 A1 | 8/2002 | Chang et al. | |
| 2002/0128728 A1* | 9/2002 | Murakami et al. | 700/10 |
| 2002/0143923 A1 | 10/2002 | Alexander | 709/223 |
| 2002/0156564 A1 | 10/2002 | Preston et al. | |
| 2002/0180579 A1 | 12/2002 | Nagaoka et al. | |
| 2002/0184301 A1 | 12/2002 | Parent | |
| 2003/0005030 A1* | 1/2003 | Sutton et al. | 709/200 |
| 2003/0009552 A1 | 1/2003 | Benfield et al. | |
| 2003/0009553 A1 | 1/2003 | Benfield et al. | |
| 2003/0041137 A1* | 2/2003 | Horie et al. | 709/223 |

| Publication No. | Date | Inventor |
|---|---|---|
| 2003/0041167 A1 | 2/2003 | French et al. |
| 2003/0051009 A1 | 3/2003 | Shah et al. |
| 2003/0052923 A1 | 3/2003 | Porter |
| 2003/0062997 A1* | 4/2003 | Naidoo et al. ............... 340/531 |
| 2003/0090473 A1 | 5/2003 | Joshi |
| 2003/0115345 A1 | 6/2003 | Chien et al. |
| 2003/0132018 A1 | 7/2003 | Okita et al. |
| 2003/0174648 A1 | 9/2003 | Wang |
| 2003/0187920 A1 | 10/2003 | Redkar |
| 2003/0210126 A1 | 11/2003 | Kanazawa |
| 2003/0236841 A1 | 12/2003 | Epshteyn |
| 2004/0003241 A1 | 1/2004 | Sengodan et al. |
| 2004/0015572 A1 | 1/2004 | Kang |
| 2004/0037295 A1 | 2/2004 | Tanaka et al. |
| 2004/0054789 A1 | 3/2004 | Breh et al. |
| 2004/0086088 A1 | 5/2004 | Naidoo et al. |
| 2004/0123149 A1 | 6/2004 | Tyroler |
| 2004/0139227 A1 | 7/2004 | Takeda |
| 2004/0162902 A1 | 8/2004 | Davis |
| 2004/0177163 A1 | 9/2004 | Casey et al. |
| 2004/0202351 A1* | 10/2004 | Park et al. ................. 382/104 |
| 2004/0243835 A1 | 12/2004 | Terzis et al. |
| 2004/0267937 A1 | 12/2004 | Klemets |
| 2005/0010866 A1* | 1/2005 | Humpleman et al. ....... 715/513 |
| 2005/0038326 A1 | 2/2005 | Mathur |
| 2005/0066045 A1 | 3/2005 | Johnson et al. |
| 2005/0069098 A1 | 3/2005 | Kalervo et al. |
| 2005/0079855 A1 | 4/2005 | Jethi et al. |
| 2005/0086126 A1 | 4/2005 | Patterson |
| 2005/0102152 A1* | 5/2005 | Hodges ......................... 705/1 |
| 2005/0108091 A1 | 5/2005 | Sotak et al. |
| 2005/0108369 A1 | 5/2005 | Sather et al. |
| 2005/0125083 A1 | 6/2005 | Kiko |
| 2005/0128083 A1 | 6/2005 | Puzio et al. |
| 2005/0149639 A1 | 7/2005 | Vrielink et al. |
| 2005/0169288 A1 | 8/2005 | Kamiwada et al. |
| 2005/0197847 A1* | 9/2005 | Smith ............................. 705/1 |
| 2005/0216302 A1 | 9/2005 | Raji et al. |
| 2005/0216580 A1* | 9/2005 | Raji et al. .................... 709/223 |
| 2005/0222820 A1 | 10/2005 | Chung |
| 2005/0231349 A1 | 10/2005 | Bhat |
| 2006/0009863 A1 | 1/2006 | Lingemann |
| 2006/0064305 A1* | 3/2006 | Alonso ........................... 705/1 |
| 2006/0088092 A1 | 4/2006 | Chen et al. |
| 2006/0105713 A1 | 5/2006 | Zheng et al. |
| 2006/0111095 A1 | 5/2006 | Weigand |
| 2006/0181406 A1 | 8/2006 | Petite et al. |
| 2006/0182100 A1 | 8/2006 | Li et al. |
| 2006/0187900 A1 | 8/2006 | Akbar |
| 2006/0200845 A1 | 9/2006 | Foster et al. |
| 2006/0206220 A1 | 9/2006 | Amundson |
| 2006/0271695 A1 | 11/2006 | Lavian |
| 2006/0282886 A1 | 12/2006 | Gaug |
| 2007/0052675 A1 | 3/2007 | Chang |
| 2007/0061266 A1 | 3/2007 | Moore et al. |
| 2007/0106124 A1 | 5/2007 | Kuriyama et al. |
| 2007/0142022 A1 | 6/2007 | Madonna et al. |
| 2007/0256105 A1 | 11/2007 | Tabe |
| 2007/0286210 A1 | 12/2007 | Gutt et al. |
| 2007/0286369 A1 | 12/2007 | Gutt et al. |
| 2007/0298772 A1 | 12/2007 | Owen et al. |
| 2008/0042826 A1 | 2/2008 | Hevia et al. |
| 2008/0065681 A1 | 3/2008 | Fontijn et al. |
| 2008/0084296 A1 | 4/2008 | Kutzik et al. |
| 2008/0147834 A1 | 6/2008 | Quinn et al. |
| 2008/0180240 A1 | 7/2008 | Raji et al. |
| 2008/0183842 A1 | 7/2008 | Raji et al. |
| 2008/0235326 A1 | 9/2008 | Parsi et al. |
| 2009/0070436 A1 | 3/2009 | Dawes et al. |
| 2009/0165114 A1 | 6/2009 | Baum et al. |
| 2009/0204693 A1 | 8/2009 | Andreev et al. |
| 2009/0240787 A1 | 9/2009 | Denny |
| 2009/0240814 A1 | 9/2009 | Brubacher et al. |
| 2010/0082744 A1 | 4/2010 | Gutt et al. |
| 2010/0095111 A1 | 4/2010 | Gutt |
| 2010/0095369 A1 | 4/2010 | Gutt |

FOREIGN PATENT DOCUMENTS

| | | |
|---|---|---|
| JP | 2004-192659 | 2/2004 |
| JP | 2004/192659 | 2/2004 |
| KR | 2006/0021605 | 9/2004 |
| KR | 2006-0021605 | 9/2004 |
| WO | WO 89/07855 | 8/1989 |
| WO | WO 01/52478 | 7/2001 |
| WO | WO-01-52478 | 7/2001 |
| WO | WO-01-99078 | 12/2001 |
| WO | WO 01/99078 | 12/2001 |
| WO | WO 2004/004222 | 1/2004 |
| WO | WO-2004-004222 | 1/2004 |
| WO | WO-2004-107710 | 12/2004 |
| WO | WO 2004/107710 | 12/2004 |
| WO | WO/2005/091218 | 9/2005 |
| WO | WO 2005/091218 A2 | 9/2005 |
| WO | WO 2005/091218 A3 | 9/2005 |

OTHER PUBLICATIONS

Examination Report under Section 18(3) re UK patent application No. GB0724760.4 dated Jan. 30, 2008.
Examination Report under Section 18(3) re UK patent application No. GB0724248.0 dated Jan. 30, 2008.
Examination Report under Section 18(3) re UK patent application No. GB0724248.0 dated Jun. 4, 2008.
Examination Report under Section 18(3) re UK patent application No. GB0800040.8 dated Jan. 30, 2008.
U.S. Appl. No. 12/630,092 Office Action mailed Jul. 21, 2010.
U.S. Appl. No. 12/019,568 Office Action mailed Jul. 13, 2010.
U.S. Appl. No. 12/019,554 Office Action mailed Jul. 12, 2010.
U.S. Appl. No. 12/019,554 Office Action mailed Jan. 5, 2010.
Form PCT/ISA/220, "PCT Notification of Transmittal of the International Search Report and the Written Opinion of the International Searching Authority, or the Declaration," 1 pg.
Form PCT/ISA/210, "PCT International Search Report," 2 pgs.
Form PCT/ISA/237, "PCT Written Opinion of the International Searching Authority," 8 pgs.
Form PCT/ISA/237, "PCT Written Opinion of the International Searching Authority," 6 pgs.
Form PCT/ISA/237, "PCT Written Opinion of the International Searching Authority," 7 pgs.
Form PCT/ISA/220, PCT/US05/08766, "PCT Notification of Transmittal of the International Search Report and the Written Opinion of the International Searching Authority, or the Declaration," 1 pg.
Form PCT/ISA/210, PCT/US05/08766, "PCT International Search Report," 2 pgs.
Form PCT/ISA/237, PCT/US05/08766, "PCT Written Opinion of the International Searching Authority," 5 pgs.
Examination Report under Section 18(3) re UK patent application No. GB0724760.4 dated Jan. 30, 2008 4 pgs.
Examination Report under Section 18(3) re UK patent application No. GB0724248.0 dated Jan. 30, 2008 4 pgs.
Examination Report under Section 18(3) re UK patent application No. GB0724248.0 dated Jun. 4, 2008 2 pgs.
Examination Report under Section 18(3) re UK patent application No. GB0800040.8 dated Jan. 30, 2008 4 pgs.
Examination Report under Section 18(3) re UK patent application No. GB0620362.4 dated Aug. 13, 2007, 3 pgs.
Alarm.com—Interactive Security Systems, Product Advantages, printed from website Nov. 4, 2003, 3 pp.
Alarm.com—Interactive Security Systems, Frequently Asked Questions, printed from website Nov. 4, 2003, 3 pp.
Alarm.com—Interactive Security Systems, Elders, printed from website Nov. 4, 2003, 1 page.
Alarm.com—Interactive Security Systems, Overview, printed from website Nov. 4, 2003, 2 pp.
X10—ActiveHome, Home Automation Made Easy!, printed from website Nov. 4, 2003, 3 pp.
Form PCT/ISA/220, "PCT Notification of Transmittal of the International Search Report and the Written Opinion of the International Searching Authority, or the Declaration," 1 pg.
Form PCT/SA/220, "PCT Notification of Transmittal of the International Search Report and the Written Opinion of the International Searching Authority, or the Declaration," 1 pg.

* cited by examiner

Figure 3G

| | Home | Sleep | Away |
|---|---|---|---|
| Back door (large) Open | None | None | None |
| Back door (large) Closed | None | None | None |
| Hall motion sensor Occupied | None | None | Conf room camera Picture... |
| Hall motion sensor Empty | None | None | None |
| Front door (recessed) Open | None | None | None |
| Front door (recessed) Closed | None | None | None |
| Mail Box door Open | None | None | None |
| Mail Box door Closed | None | None | None |
| Garage door (large) Open | None | None | None |
| Garage door (large) Closed | None | None | None |

Remote controls operate the same in all modes

Keychain remote Lamp button on — Floor lamp Level...
Keychain remote Lamp button off — Floor lamp Level...
Keychain remote Star button — Wireless camera Picture...
Keychain remote Lock button — Change Mode mode...
Keychain remote Unlock button — Change Mode mode...

| Name | Last Update | Device |
|---|---|---|
| Gateway | Today at 4:01 PM | iControl Networks: Beta Gateway |
| Back door (large) | Today at 3:13 PM | GE Security: 60-670-95R Door/Window Switch |
| Freeze sensor | Today at 3:30 PM | GE Security: 60-742-95R Freeze Sensor |
| Conf room camera | Today at 3:51 PM | Axis Communications: 205 |
| Floor camera | Today at 3:55 PM | Axis Communications: 205 |
| Hall motion sensor | Today at 3:11 PM | GE Security: 60-639-95R Passive Infared Motoin Detector |
| Thermostst | Today at 4:00 PM | GE Security: 60-909-95 Thermostat |
| Front door (recessed) | Today at 3:47 PM | GE Security: 60-741-95 Recessed Door/Window Switch |
| Keychain remote | 3/2 5:14 PM | GE Security: 4 Button Remote 60-659-95R |
| Mail Box door | Today at 3:33 PM | GE Security: 60-688-95 Micro Door/Window Switch |
| Floor lamp | Today at 4:01 PM | Axsys Automation: Lamp Module |
| Wireless camera | Today at 3:51 PM | Axis Communications: 205 |
| Garage door (large) | Today at 3:06 PM | GE Security: 60-670-95R Door/Window Switch |

Figure 3H

Figure 7 - System Architecture

Figure 8 - Gateway Data Handling

Figure 9 - Data Conversion

Figure 10 - Binding Data Flow

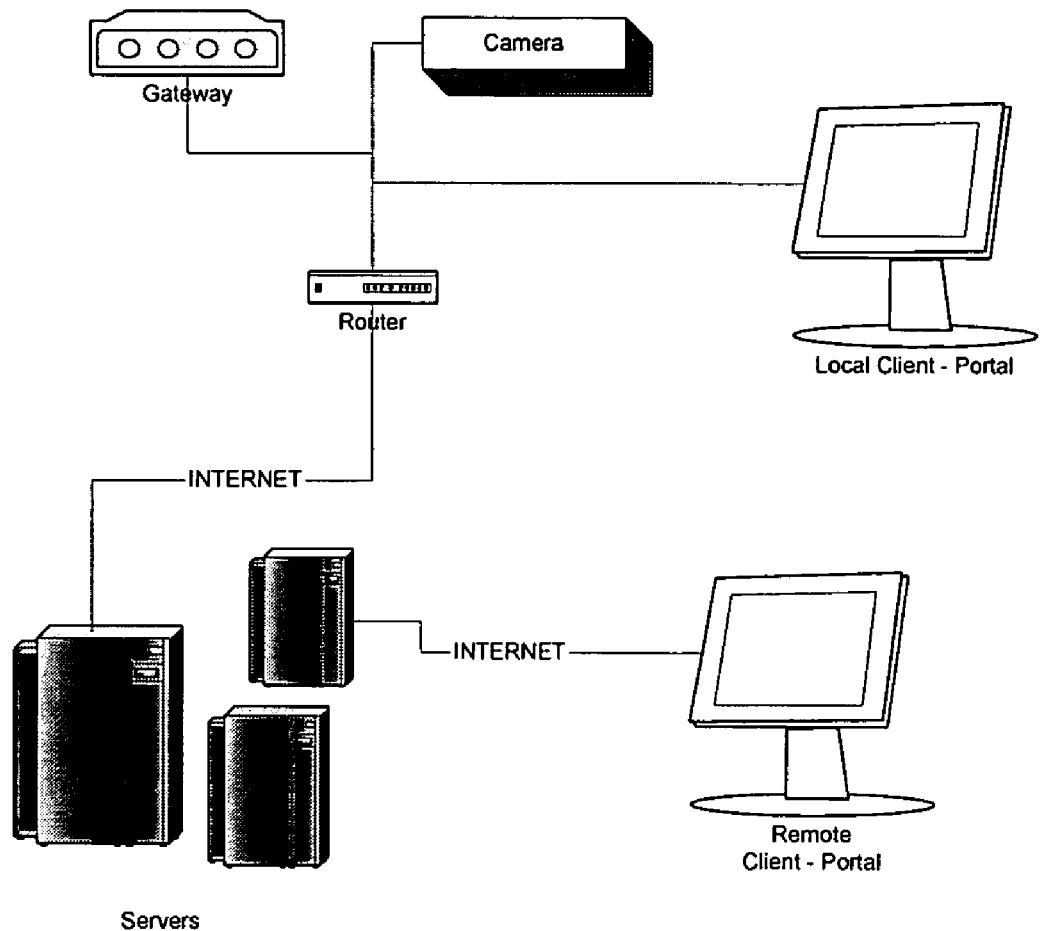
Figure 12 - Camera Image/Video Architecture

PREMISES MANAGEMENT NETWORKING

CROSS-REFERENCE

This application is related to and claims the benefit of the following United States patent applications:

U.S. provisional application No. 60/553,934 for Business Method for Premises Management, invented by Reza Raji and Chris Stevens, filed Mar. 16, 2004;

U.S. provisional application No. 60/553,932 for Premises Management Networking, invented by Gerry Gutt and Reza Raji, filed Mar. 16, 2004; and U.S. provisional application No. 60/652,475 for Control Network, invented by Gerry Gutt and Reza Raji, filed Feb. 11, 2005.

Each of the foregoing applications is incorporated herein by reference in its entirety.

This application is also related to U.S. nonprovisional application entitled Business Method for Premises Management, invented by Reza Raji and Chris Stevens, being filed concurrently herewith, and which is incorporated herein by reference in its entirety.

BACKGROUND OF THE INVENTION

Vendors such as premises vendors, communication service vendors, and Internet portal vendors need a solution for extending their relationship with vendees beyond the immediate transaction. Additionally, vendees desire additional premises management services beyond the immediate transaction for premises, communication services, or Internet portals. There is a need for advanced premises management services.

INCORPORATION BY REFERENCE

All publications and patent applications mentioned in this specification are herein incorporated by reference to the same extent as if each individual publication or patent application was specifically and individually indicated to be incorporated by reference.

BRIEF DESCRIPTION OF THE DRAWINGS

FIG. 3G shows an automation tab screen according to an embodiment of the invention.

FIG. 3H shows a system tab screen according to an embodiment of the invention.

FIG. 12 is a diagram showing a camera environment.

DETAILED DESCRIPTION OF THE INVENTION

Figure 1:
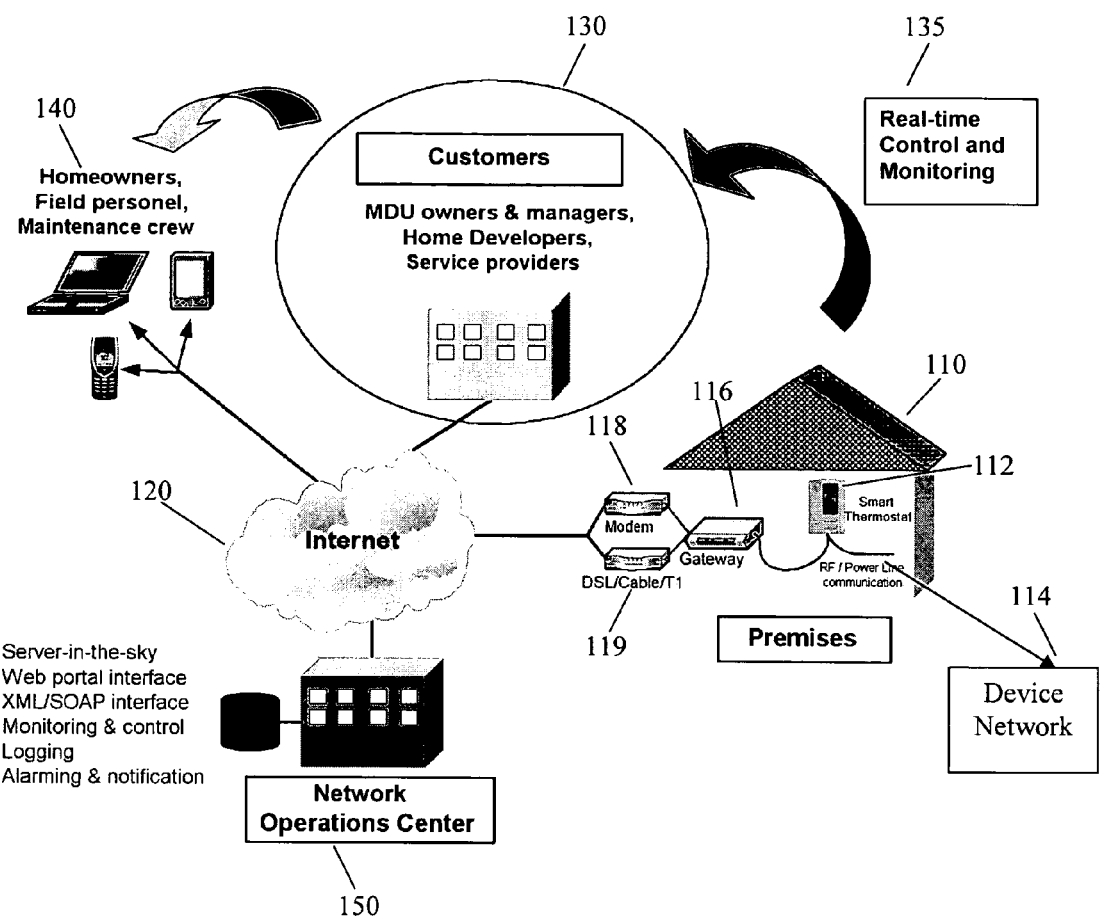
FIG. 1 shows an example of an overall network for premises management.

FIG. 1 shows an example of an overall network for premises management. A premises 110 has premises management devices such as a smart thermostat 112. The premises management devices are connected to a premises network 114 which can be, for example, an RF and/or power line network. The premises network 114 is connected to a gateway 116 which in turn is connected to a broadband device 119 such as a DSL, cable, or T1 line. The gateway 116 can alternatively or also be connected to a dial up modem 118. The premises 110 is connected to the Internet 120. The Internet 120 is connected to system managers at the network operations center 150. The Internet 120 is also connected to customers of the system manager, for example vendors such as premises vendors, communication service vendors, or Internet portal vendors. The Internet 120 is also connected to vendees 140, such as premises vendees, communication service vendees, or Internet portal vendees.

Figure 2:
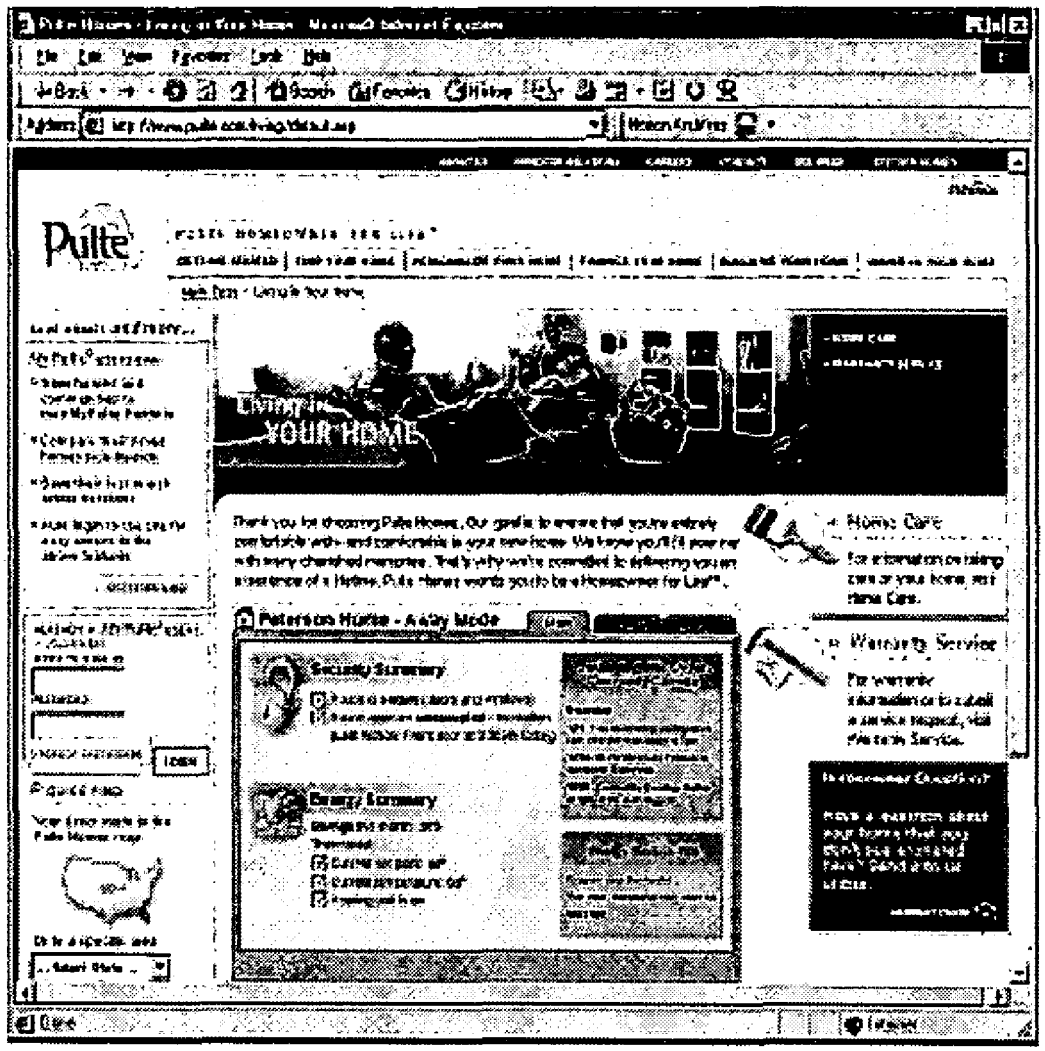
FIG. 2 shows an example of a homebuilder-branded Internet portal for premises management.

FIG. 2 shows an example of a homebuilder-branded Internet portal for premises management.

Figure 3A:
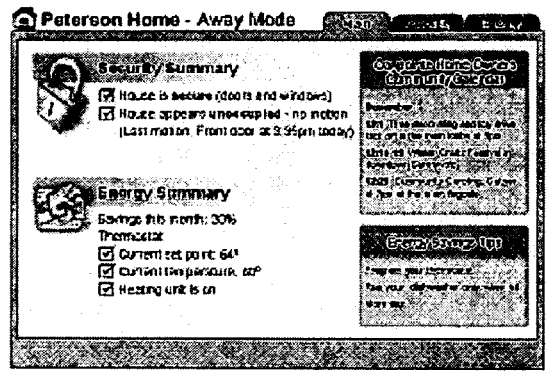
FIGS. 3A-3C show examples of detailed screens of the portal interface for premises management.
Figure 3B:
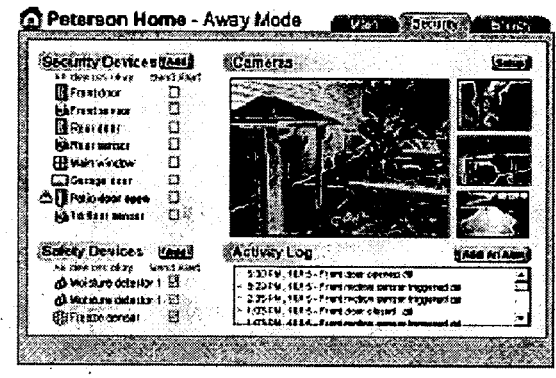
Figure 3C:
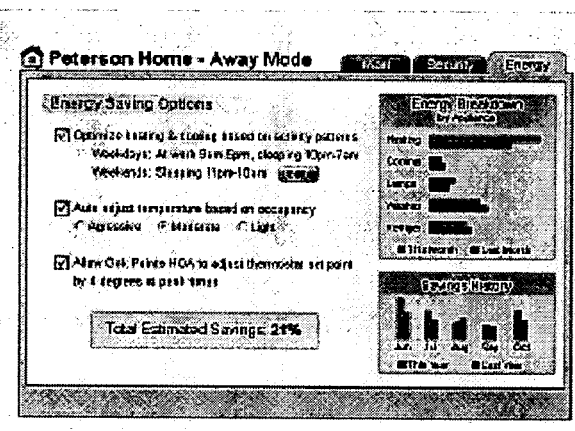

FIGS. 3A-3H show examples of detailed screens of the portal interface for premises management. FIG. 3A shows a main screen summarizing premises management services. FIG. 3B shows a screen summarizing security management services and safety management services. FIG. 3C shows a screen summarizing energy management services.

Figure 3D:
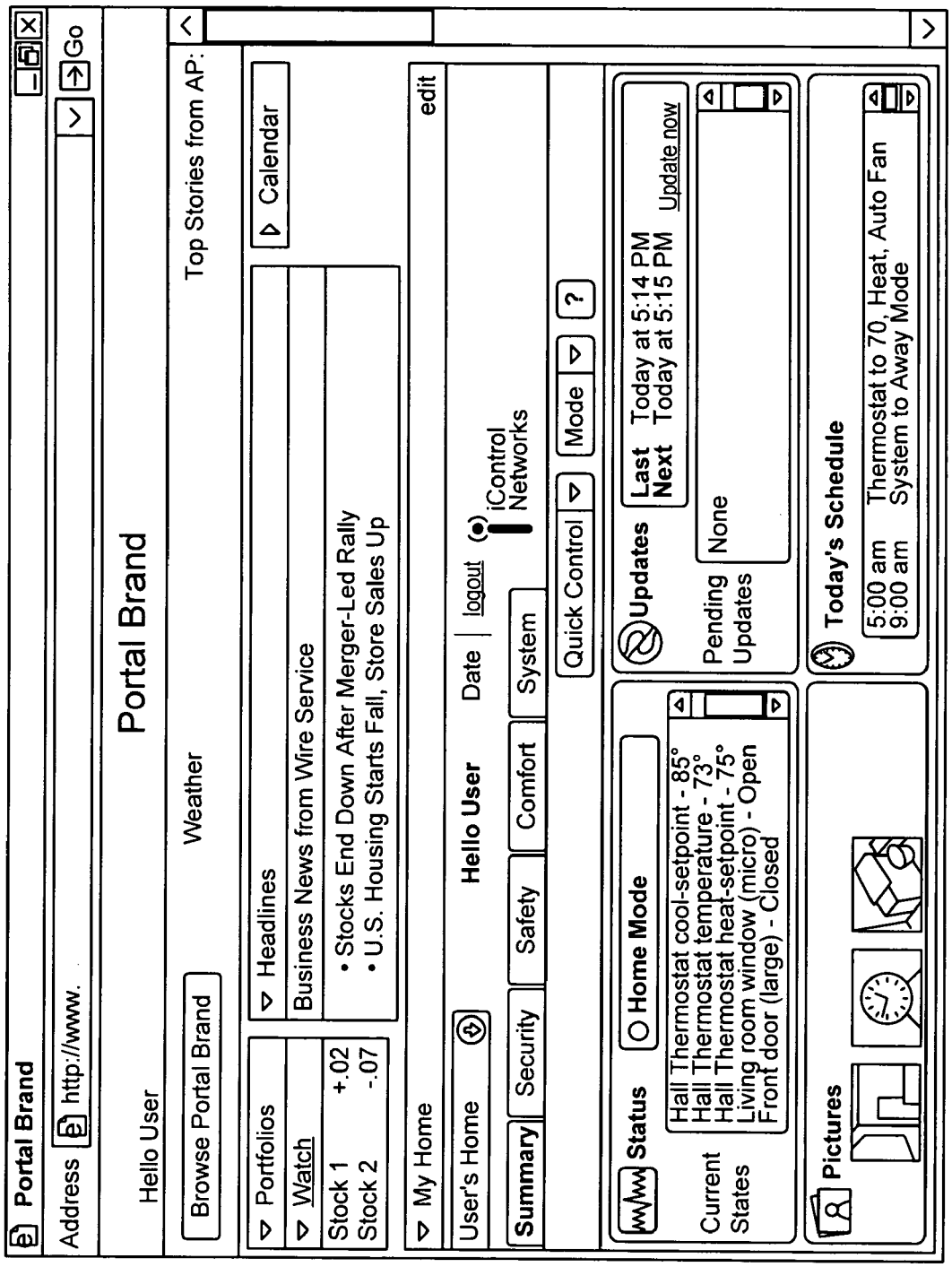
FIG. 3D shows a screen shot of a Internet Portal-branded portal for premises management according to an embodiment of the invention.

FIG. 3D is another example, illustrating how services offered by the system can be branded and incorporated into a third part web portal, for example, in a personal portal such as one provided by Yahoo. The screen includes the usual Yahoo portal content such as the stock pane on the left, the news pane on the top and the calendar pane on the right. The system-specific pane is included on the bottom where the user can access monitoring and control information on the home or business. The look and feel of the system pane can be tailored by the service provider.

Figure 3E:
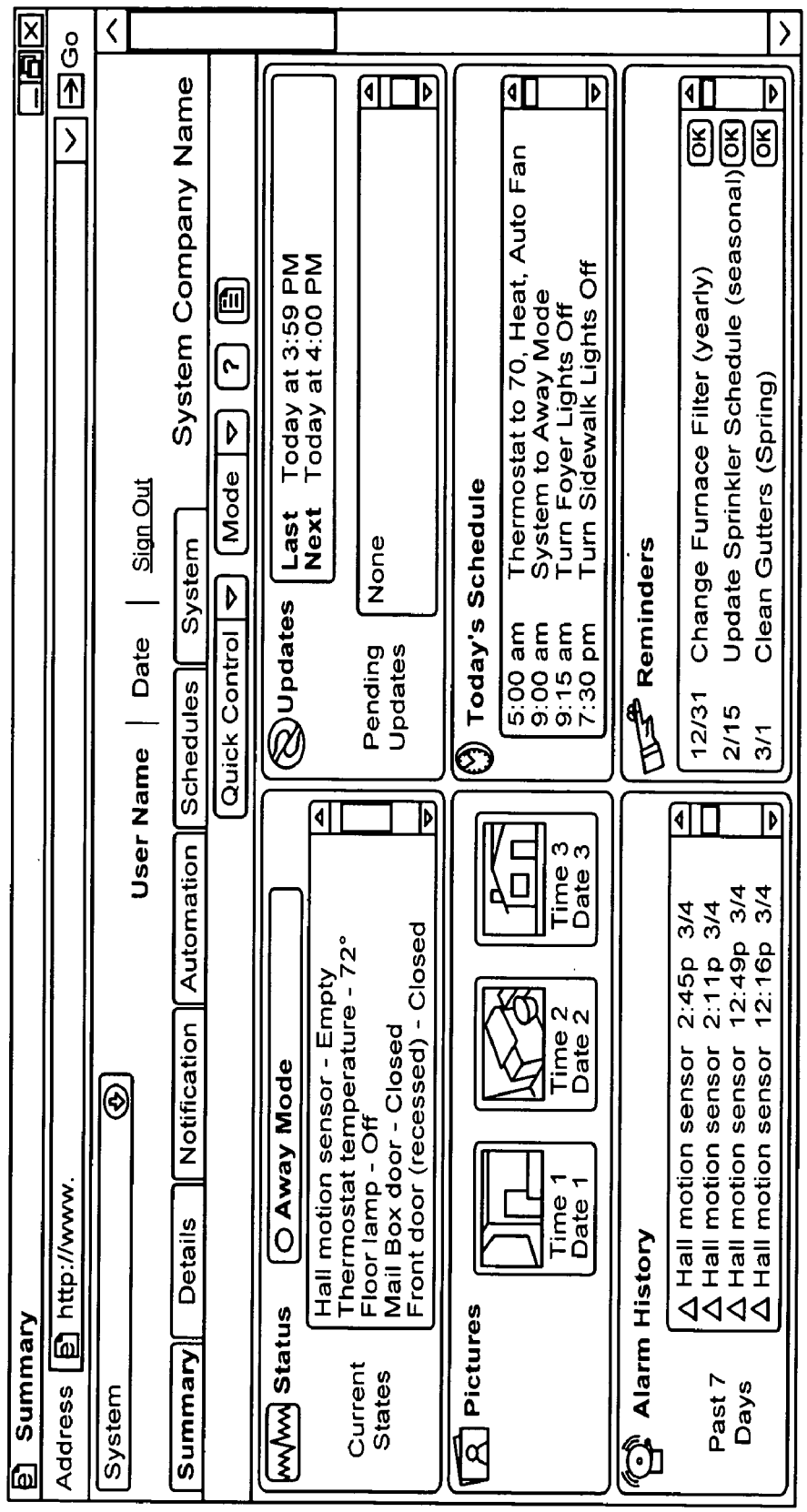
FIG. 3E shows a screen shot of a main portal summary page according to an embodiment of the invention.

The system portal summary page in FIG. 3E shows a snapshot of the state of the various devices in the user premises. At the top left is a drop-down box that displays the name of the premises being shown on the screen. The user can change premises by clicking on this box and selecting a different premises. A series of tabs allow the user to switch to Details, Notifications, Automation, Schedules and Systems screens for performing other system functions. The various panes on this page highlight different features.

The status pane lists the different devices in the user premises along with their actual states. The pending updates pane shows the time of the last communication between the premises and the server as well as any pending updates waiting to be sent downlink to the premises. The pictures pane shows the last several (e.g. last four) pictures taken by the camera in the user premises. The user can click on a thumbnail picture to look at a larger version of the photo as well as access archived images for that camera, look at live video, take new pictures or delete photos. The schedule pane shows the schedules activities for the premises. The alarm history shows an archive of the most recent event and activity in the user premises. The reminders pane provides a means for the system to remind the user to perform certain activities or functions related to their home or business. The mode drop down button on the blue navigation bar allows the user to switch between the systems modes. The QuikControl drop down allows the user to control any device that is controllable (e.g. camera, thermostat, lamps, etc.).

Figure 3F:
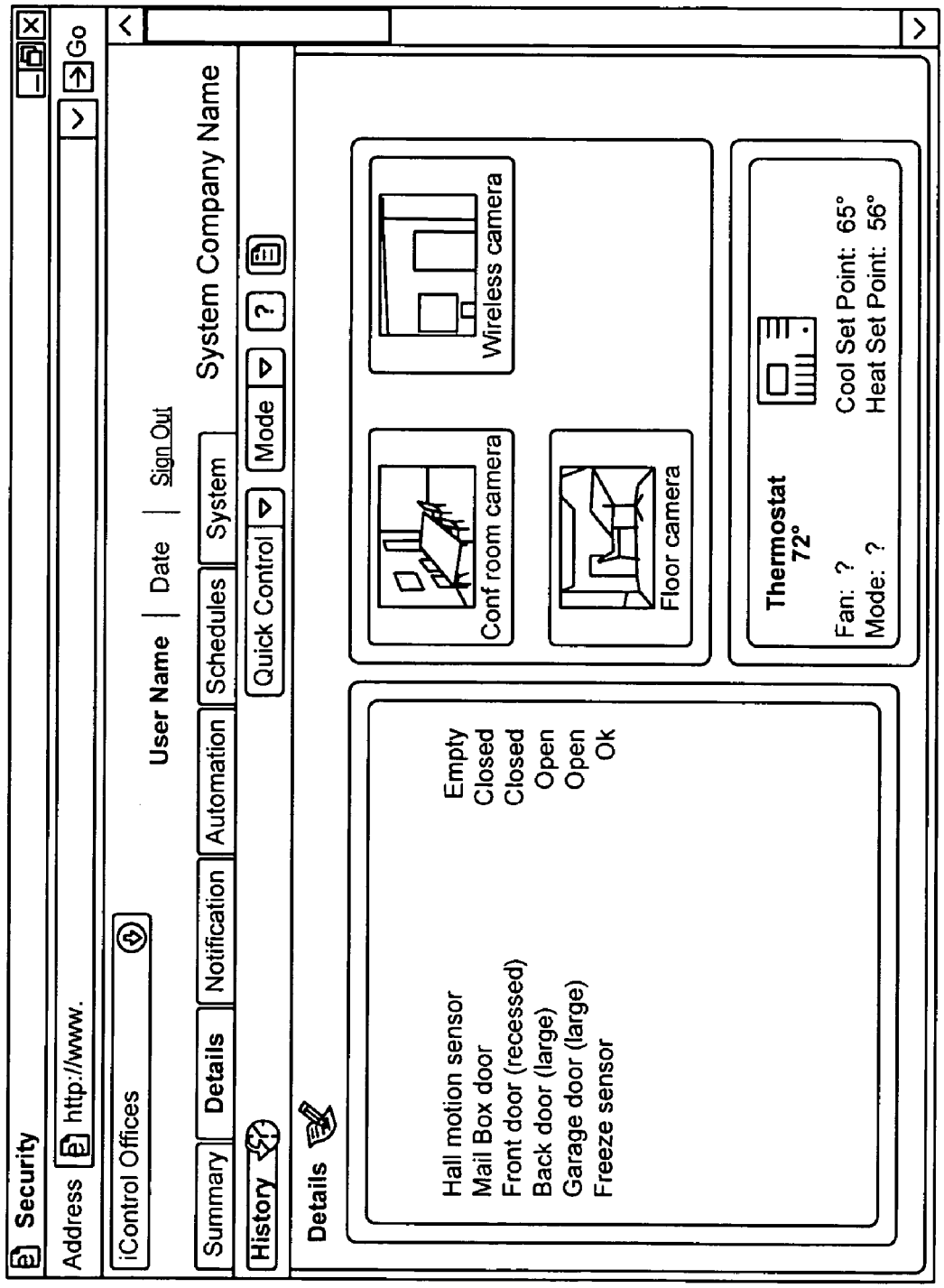
FIG. 3F shows a screen shot of a portal showing details device information according to an embodiment of the invention.

FIG. 3F shows a details screen of the portal showing details device information. The details screen allows the user to show more detailed device data. The list on the left displays the system devices and their actual states/values. The pictures pane on the top right display the camera thumbnails (beyond the 4 displayed on the summary page). The thermostat pane on the bottom right shows the details of the thermostat data including the current temperature, cooling and heating set points as well as the thermostat mode.

FIG. 3G shows an automation tab screen. This screen shows how the user may assign automation rules to devices such that an event caused by a device can trigger one or more actions by other devices. The left column shows all possible events that can occur based on the devices that belong to this premises network. The three columns, one per mode, identify the action for each event for that mode. For example, the figure shows that when hall motion sensor occupied event occurs in the away mode, the conference room camera takes a picture. The bottom portion of the screen shows that the wireless keychain remote control's buttons can also be programmed by the user to perform any action desired.

FIG. 3H shows a system tab screen showing status of devices. The System screen shows a list of all the devices in the premises' network, including the gateway. Each device in the system is on a separate line. The first column shows the name of the device along with a status indicator which show different colors based on the status of the device (green for ok, yellow for offline, red for not found or problematic). There is also a "last update" column that displays the date and time of the last signal received from that device. The third column (device) describes the type and model number for that device. The user can get more detailed information about a device by clicking on the line corresponding to the respective device.

Figure 4:
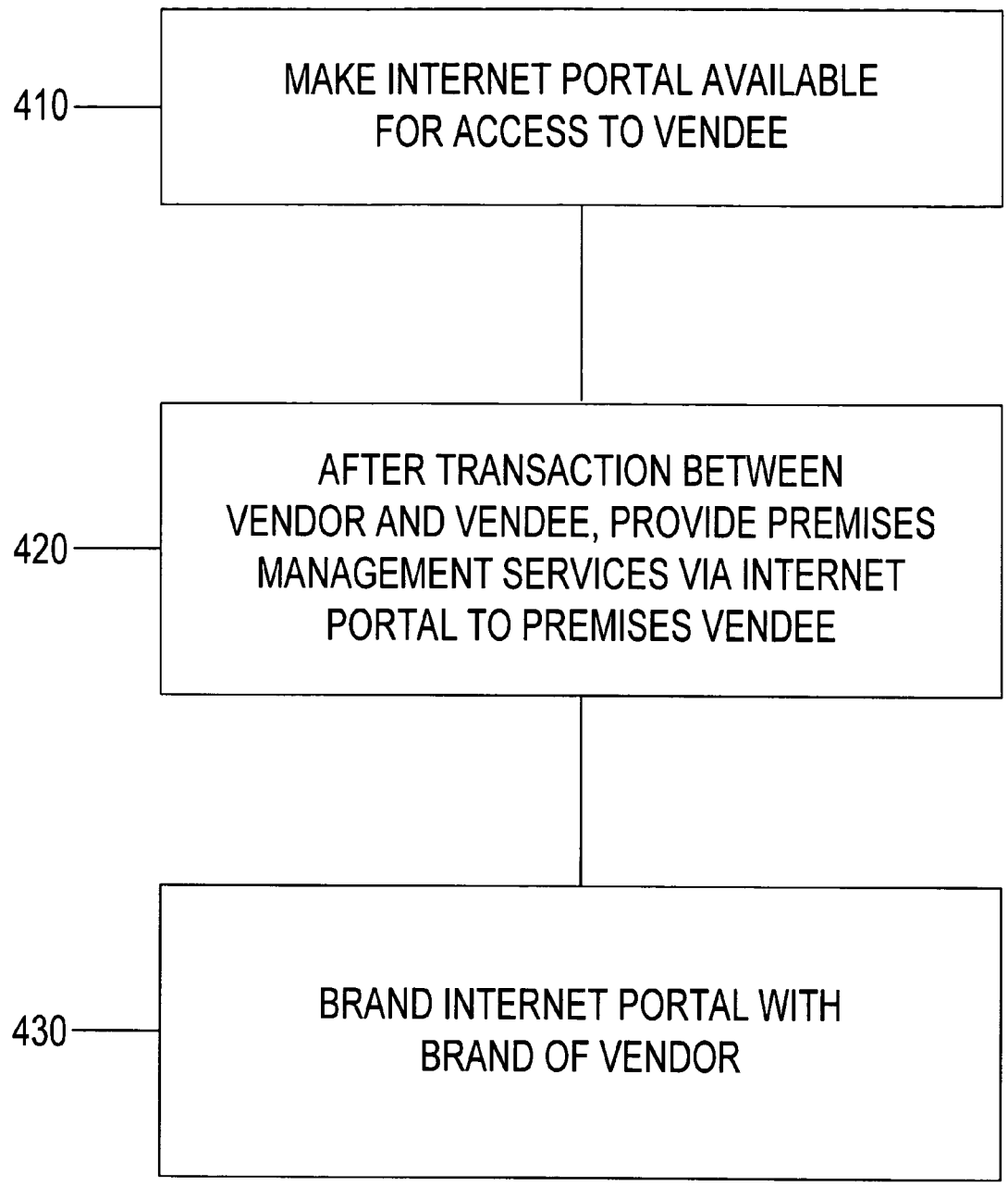
FIG. 4 is a diagram of a business method for premises management.

FIG. 4 is a diagram of a business method for premises management. In 410, an Internet portal is available for access to a vendee, such as a premises vendee, communication service vendee, and/or an Internet portal vendee. In 420, at least after a transaction between the vendor and the vendee, such as a premises transaction, a communication services transaction, and/or Internet portal services transaction, premises management services are provided via the Internet portal to the vendee. In 430, the Internet portal is branded with the brand of the vendor. The shown steps can be added to, removed, rearranged, and/or modified.

Figure 5:
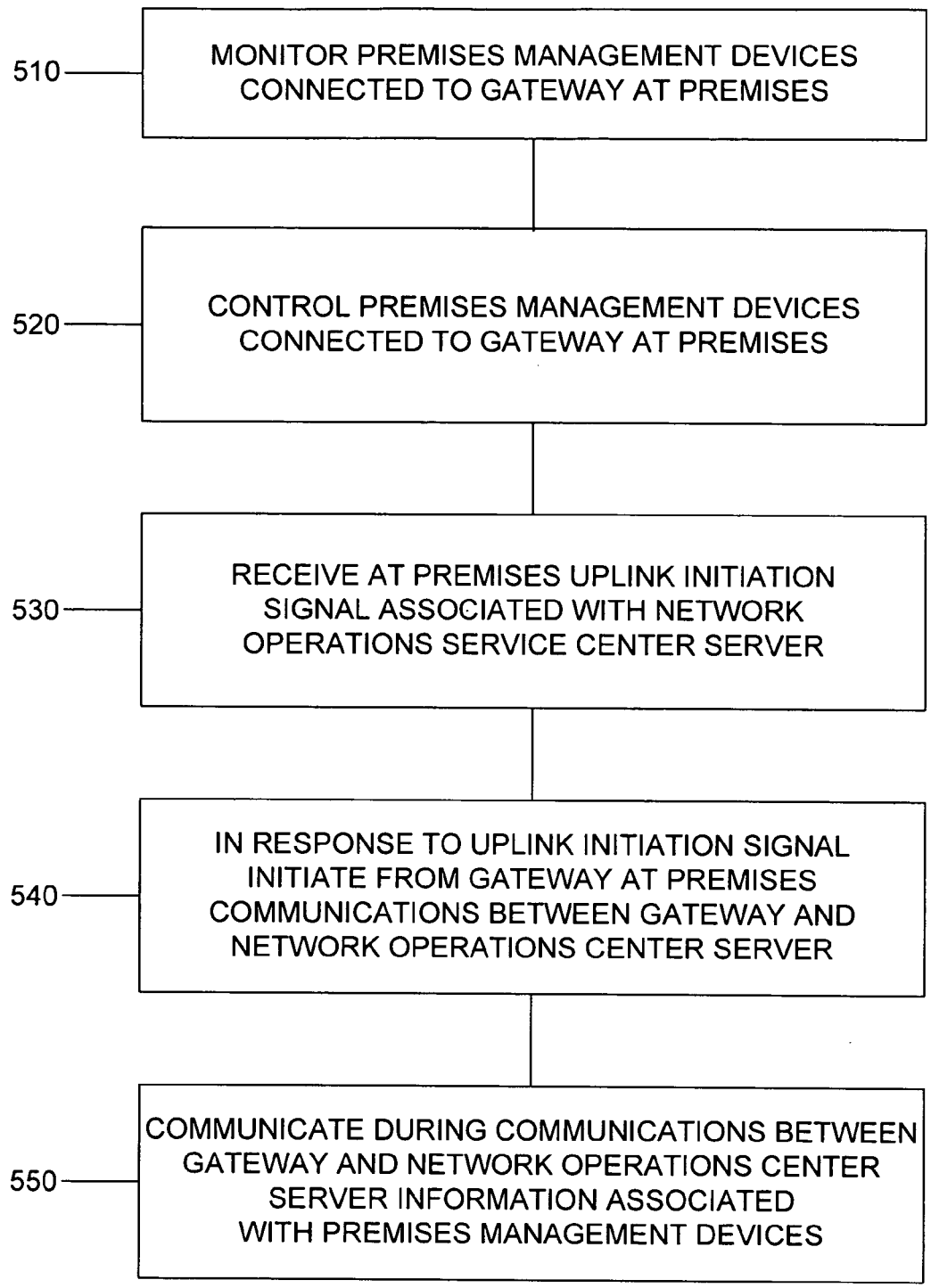
FIG. 5 is a diagram of a method for premises management networking.

FIG. 5 shows a diagram of a method for premises management networking. In 510, premises management devices connected to a gateway at a premises are monitored. In 520, premises management devices connected to the gateway at the premises are controlled. In 530, an uplink-initiation signal associated with a network operations center server is received at the premises. In 540, in response to the uplink-initiation signal, communications between the gateway and the network operations center server are initiated from the gateway at the premises. In 550, during the communications between the gateway and the network operations center server, information associated with the premises management devices is communicated.

Property developers and service providers can:
1. Differentiate their offering from their competitors'
2. Generate new recurring revenue through new, value-added services
3. Reduce their operating costs
4. Increase the value of their offering
5. Increase the effectiveness and reach of their brand
6. Make smarter, knowledge-based business decisions
7. Increase customer retention and satisfaction Additional content leverages the broadband infrastructure, thereby increasing the effective value of the broadband pipe.

Property developers/managers and service providers are facing ever increasing competition and lack the expertise, time and resources to offer control and telemetry services to their customers. Connecting people to devices is the next evolutionary step for the Internet.

Some of the architectural/design goals for the system are low cost, ease of use, and scalability.

The architecture and products/service offering is flexible enough to cater to the needs of the homeowner while being scalable and intuitive enough to allow for easy installation and minimal support.

Three types of customers are envisioned for the system. Although the ultimate end user is the property owner, customers can be: home developers and commercial property, e.g. multiple tenant unit (MTU) owners and managers; service providers (telcos, cable companies, ISPs, etc.); and homeowners or commercial building tenants.

The actual user of the services resides in the premises where, for example, the gateway and devices are installed. The system can be intuitive enough that the "average" end user can perform the installation and configuration steps.

The installer can be the person or entity that installs the gateway and the devices in the home, configures the gateway, connects the gateway to the Internet and/or telephone line and/or performs any troubleshooting necessary. Depending on the actual customer, the installer can be 1) the installation crew of the service provider or property developer, 2) an outsourced installation outfit hired by the service provider or property developer, 3) an outsourced installation outfit hired by the end user, or 4) the end user.

The premises gateway can be a low-cost and stand-alone unit that connects the in-premises devices to the server. The connectivity to the Internet can be accomplished via a broadband connection (T1, DSL or cable) and/or via the telephone line. Though broadband connectivity is preferred due to its persistence and throughput, telephone connectivity is recommended to be present as a back-up option in case the broadband connection is lost. For premises without a broadband connection (e.g., vacation homes) a telephone-only connection can be used.

The service portal provides an intuitive end user interface to the premises network as well as access to system and network configuration screens and user account information and settings.

Some embodiments of the overall system can be put in use through the following steps:
1. Customer need for telemetry services is established
2. Customer (via web or phone) orders a system
3. Customer acquires system (via service provider, builder, etc.)
4. A service account is established (by the service provider/builder or by the homeowner or system manager)
5. Gateway is registered (by the service provider/builder or by the homeowner)
6. Gateway sends network/device information to the server 7. Homeowner configures own home (alarms, notifications, binding, etc.)
8. Future devices are added to system either via pre-configuration by system manager or via the end user through configuration screens on portal Each of these steps is described below:

Customer Need is Established

This can done through the property developer, the service provider sales channel or direct advertising by the system manager.

Customer Orders a System from System Manager

The customer specifies what kinds of devices are needed and where each one will reside in the premises (e.g., living room thermostat, lobby motion sensor, etc.). The user account is then appended by system manager to include this information as well as the actual unique ID for each device shipped to the customer.

Customer Acquires System

The gateway and devices can be acquired by the customer in several ways:
1. Pre-installed by the property builder/developer/manager or service provider
2. Directly purchased by the end user The choice of devices can depend on the particular services and functionality desired by the customer.

Once the customer acquires the gateway and devices, the devices are physically installed in the premises. This task can be performed with the help of an installer, or for smaller premises, performed by the end user.

A Service Account is Established

This is generally done by the end user as the process uses personal information (name, payment option, etc.). The account registration involves the user logging on to the system manager web site and establishing a new account by entering name, address, phone number, payment details and/or the gateway serial number printed on the gateway in the end user's possession.

In some cases the system manager service account may already be pre-established with the gateway serial number and the end user simply has to update the account with personal and payment information. This scenario eliminates the need for the end user to deal with any cumbersome serial numbers or keys and is really more of a personalization step.

Multiple gateways can also be handled per user account.

Gateway is Registered

This step involves the association of the user account on the system manager server (established in the previous step) with an actual gateway in the user's home. The gateway is connected to a broadband network or the telephone line in the home.

For this step, the installer, for example, presses a SYNCH button on the gateway, and initiates an uplink communication from the gateway to the system manager server using a default (first-time) IP address or, in the case of a dial-up-only connection, a toll free number dial by the gateway.

Upon establishing a connection with the server and locating its corresponding user account (e.g., established in a prior step), the gateway acquires a system manager server IP address (to be used from that point on for all gateway to server communication), and changes its state from unregistered to registered.

In the case where the gateway is pre-installed by the developer or service provider, this step may have already been performed.

The gateway may not be able to perform any functions until it has gone through this registration process (as indicated by the state of the gateway).

Gateway Sends Network/Device Information to the Server

This is done on a regular basis and can always be initiated by the gateway. The server dictates the interval for uplink communication initiation between the gateway and server.

Homeowner cconfigures Home (Alarms, Notifications, Binding, etc.)

This is the normal use of the system manager portal whereby the user selects the various monitoring, logging and notification options.

Future Devices are Added to System

The end user obtains additional devices from the system manager, in which case they are added to the end user system by the system manager before being shipped to the customer.

Alternatively, the end user could purchase a device from a third party source in which case they could use the system manager portal interface to add (or replace) the device manually.

In addition, the system manager gateway can have a provision for "discovering" devices by listening for RF messages (e.g., GE Interlogix) or service pin messages (e.g., LonWorks devices).

Overview

Parts of the system as a whole are described, including the gateway, the server and the web portal interface.

System Overview

At the highest level, the system provides its users with a hosted and managed service for premises device monitoring and control for a fee, such as a monthly subscription fee. The premises markets include residential homes, commercial MTUs as well as small businesses.

The traditional complexity and expense of installing and maintaining such a system is delegated to the system manager platform. As a revenue-grade Application Service Provider (ASP) business, the system provides reliability, scalability, security, cost-effectiveness, ease-of-use, and flexibility.

The term "system" can denote the portal, server, gateway and end devices.

Reliability

The system can provide a high degree of reliability. This includes 24-7 operation of the Network Operations Center (NOC) and the server software it contains, and the reliability and fault-tolerance of the gateway and the control devices.

Scalability

The system, specifically the NOC, can scale to accommodate large Numbers (in one embodiment, millions) of gateways and devices (in one embodiment, tens of millions). Though this may not be used at the onset, necessary architectural provisions can be built into the system to allow for such expandability.

Security

As a revenue-grade service offering, the system provides security against intentional and unintentional interference with the normal operation of the system. The system can be reasonably immune to external unauthorized access (either over the Internet or device network media). The system can provide reasonable protection against spoofing (of NOC server, gateway or device).

Cost-Effectiveness

Similar systems in the past have suffered from a high cost of in-premises devices and gateway as well as high and/or unpredictable installation costs. The system installation process is simple in order to minimize, if not eliminate, the installation costs.

Ease-of-Use

The gateway and device installation process as well as the various user configuration and normal use menus/screens presented by the portal are, according to an embodiment, intuitive and easy to use. This eases the adoption and continued use of the system by its users.

Flexibility

The system is flexible enough to easily handle different device networking protocols/technologies should the need arise in the future. In addition, the system, including the web interface, can be adapted to different markets and applications.

Variable Logging

The system can log any device variable specified by the user for up to, for example, 30 days. The user defines a logging interval for each variable at the time of configuration. The logging feature can be handled by the gateway on the local device side and the data can be transferred to the server at regular intervals. The overall variable log for all variables can be kept on the server side.

Logging of data for more than, for example, 30 days (but no more than, for example, 180 days) can be provided to the user, for example for a nominal fee.

The system can allow for the logging of at least, for example, 10 variables per gateway. The minimum logging interval for any variable can be, for example, 5 minutes. Logging intervals provided can be, for example, 5, 15, 30, 60, 180 minutes as well as 6, 12, 24 hours and weekly.

Activity Logging and Tracking

The system must be able to provide at least, for example, a 14-day history log of all user, system and device actions. An action includes a change to a device variable, system or network settings brought on by either the system or the user (e.g., variable changed, logging enabled, device added, user notified, etc.). The user can trace back system activities to their cause and to the date and time they occurred. Past activities can be searched by variable, device, category or date.

System Modes

The system can support user-defined modes, such as "home", "away", "sleep", "vacation", etc. The mode the user network is in plays a factor in the determination of the actions taken (reporting, alarming, eventing, notification, etc.) by the system when variable changes occur.

System mode can be changed by the user via methods such as:
1. Via the portal interface
2. Through a schedule set by the user
3. Via a binding (a variable change tied to the mode change—e.g., RF remote control)

The system can provide a set of default modes based on the user profile (homeowner, business, vacation home, etc.). These default modes are a starting point that can be changed or added to by the user at any time.

Alarming

The user can specify alarm conditions for variables with discrete states (e.g., binary ON/OFF). These alarms can be reported in real-time (i.e., immediate uplink) by the gateway to the server. The server then in turn looks at the data and determines, based on user alarm settings, whether to notify the user or not.

Alarm conditions can be determined based on the value or state of a variable as well as the system mode.

Eventing

For non-critical events, the system can notify the user in non-real-time fashion regarding the state of any variable specified by the user. The variables chosen for user eventing can be of any kind (discrete or continuous). The gateway updates the server with the change of variable state/value at a regularly scheduled upload. The server continuously looks at variable data and determines, based on user eventing settings, whether to notify the user or not.

Eventing conditions can be determined based on the value or state of a variable as well as the system mode.

User Notification

The system can support user alarming and eventing via the following methods: email, text messaging, pager, and/or voice telephone call (voice synthesis).

Device Data Monitoring and Control

The user can specify any device variable for monitoring and control via the server portal. For example, up to 255 devices can be supported by a single gateway. For example, up to 512 variables can be supported by a single gateway.

The user can schedule specific variable updates (e.g., turn off thermostat at 8 am every Tuesday). Scheduled events can be canceled (gateway-server protocol can support this). A scheduled variable update is allowed, per time stamp and variable ID. If time stamp and variable ID match an existing scheduled variable change, then the value for that pending variable change is re-written with the new value. A given variable can have multiple scheduled values as long as each scheduled update has a different time stamp.

Any pending downlink variable change commands can be canceled that have not been relayed to the gateway at any time through the portal interface.

Device Network Support

The system can support an open architecture where most, if not all device networking protocols can be supported. Examples of specific device protocols supported by the system include RF and powerline protocols, such as GE Interlogix RF and Echelon LonWorks power line (PL & FT), simplifying the installation burden by requiring no new wires to be installed in a premises.

The LonWorks free topology twisted pair medium (FT-10) can be supported as an option to better support commercial applications (e.g., office buildings).

All devices, regardless of the technology, can possess these attributes:
1. Unique ID (global)
2. Non-volatility. Must not lose any pertinent data or state.
3. Low-battery indication over the network (if battery-operated)
4. Tamper detection (if security-sensitive)

RF

This system includes a low-level, simple unidirectional protocol for multiple sensors to talk to a receiver head end. The protocol needs and footprint are relatively small and as such the RF devices are comparatively low-cost and small. They also can function for several years without the need for a battery change for simplified installation and maintenance of the system by the user.

A bi-directional RF transceiver can be supported by the system. This allows for control as well as monitoring of remote devices (e.g., thermostat) by the user.

The following RF devices can be supported by the system:
1. Door and windows sensor
2. Motion sensor
3. Smoke alarm
4. Water sensor
5. Freeze sensor
6. Contact closure sensor (e.g., ITI DWS with external connector pins)
7. CO alarm
8. Heat sensor
9. Thermostat
10. RF remote control

PL

The power line solution offers a robust and reliable mechanism for communicating over existing residential power line wiring.

The following PL devices can be supported by the system:
1. Thermostat (e.g., RCS)
2. Load controller (e.g., Halen Smart)
3. Relay actuator (e.g., Comap)
4. Photo camera, e.g., black & white, low-resolution (with motion sensor)

FT

The Free Topology solution offers a cost-effective medium for commercial applications. Many third party LonWorks devices use this medium for communications.

Other Devices

The following is a non-exhaustive list of a few other devices supported by the system.
1. Small data/message display—for text messages, news, weather, stock, photos, etc.
2. Door latch control
3. Pool/spa controller
4. Weather station
5. Lighting control
6. Elderly or disabled monitoring
7. Irrigation controller (Bibija)
8. VCR programming Cameras The system can support cameras. For example, standard off-the-shelf IP cameras (also referred to as web cameras) may be used, such as those available from vendors such as Axis, Panasonic, Veo, D-Link, and Linksys, or other cameras manufactured for remote surveillance and monitoring.

Surveillance cameras may contain a standalone web server and a unique IP address may be assigned to the camera. The user of such a camera would typically retrieve the camera image by accessing the camera's web page through a standard web browser, using the camera's IP address. In some cases the IP camera acquires a local IP address by using a DHCP client to negotiate an address from the local DHCP server (usually residing in the user's router/firewall).

According to an embodiment, the gateway treats camera images as it does other sensor or device data. User commands to "snap" a picture are sent from the system's portal/server to the local premises gateway during scheduled communications between the gateway and server (initiated by the gateway). Alternatively, a picture "snap" command for a local or remote camera can be initiated by a sensor (e.g., motion detector, remote control, etc.) on the local device network. The gateway then in turn talks to the camera over the IP network (wired or wireless) to retrieve the image and pass that image up to the system's backend server, effectively acting as a pass-through agent for the camera.

Since the data from the gateway (including the camera image) is pushed up from the gateway to the server using standard HTTP protocol (used by web browsers), additional configuration of the user network may be avoided. Also, adjusting of the user's firewall (port forwarding, DMZ, etc.) may be avoided (i.e., simpler installation and enhanced security).

Also, the push mechanism eliminates all the issues related to accessing the camera from the Internet, namely firewall and dynamic IP issues mentioned above, since the user gets the images from the system servers and not from the premises directly.

The system's user portal interface acts as a unified user interface for the user by displaying multiple images from different cameras in the same user interface page (e.g., web page).

The system's IP cameras can be physically located anywhere as long as they are connected to the Internet (if remote) or to the local IP network (if local).

Due to the fact that the images are served from the system's server (as opposed to the local camera or network) potential security exposure of accessing the home network directly from the outside may be avoided. Also, additional security measures can be put in place (e.g., SSL) to block an unauthorized user from accessing the images on the server.

Device Low-Battery Notification

The system can notify the user via the web portal of any low-battery conditions for the devices that operate on battery (e.g., GE Interlogix devices).

Server-Side Binding

The system can send variable control information downlink based on variable information collected through the uplink connection. This rule-based exchange can take place within the same atomic uplink-downlink (request-response) exchange between the gateway and server. The user specifies the actual "rules" for such bindings (e.g., turn off the thermostat when there is no motion in the premises for 2 hours).

This implementation may impact scalability because of the atomic communication factor.

Local Binding

Local binding can permit a more real-time interaction between devices. This functionality can take place without the server's involvement (other than the initial configuration of the local rules). The local binding, given the different technologies used at the device level, needs to be routed through the gateway.

Gateway Shoulder Tap

The server can "call" a gateway if the user requests that a variable change be propagated to a device in real-time (rather than waiting for the next gateway uplink connection on).

Device Sharing Between Different Users

The system can provide a means for a single device to be managed by multiple users. For example, a security gate or a pool temperature sensor in a property common area should be accessible by all residents in the complex.

Gateway

The gateway is the central link between the premises device network and the backend server. It can be a thin, low-cost client of the server and use the least amount of hardware and software without compromising the basic functionality and objectives of the overall system.

Internet Connectivity

The gateway can provide both a connection to a broadband network (Ethernet DSL or cable modem) and telephone network. The telephone network connection provides a second, redundant route for accessing the server in case the broadband network access is down and there is a need for the gateway to report critical alarm information uplink to the server. The telephone connection also provides a means for the system to support premises that have no broadband connection available (e.g., as in many second or vacation homes).

The gateway can terminate any data call in process if a user picks up a telephone and provide a dial tone immediately. In addition, the gateway may not initiate a data call if the phone is in use by the user (off hook).

They gateway can dial out in the absence of external power to the gateway.

Communication with Server

The gateway can initiate all communications with the server. Gateway communication can either initiate based on a predetermined schedule (e.g., every 30 minutes) or due to a local premises alarm (selected by the user).

Gateways can contact a common server for their first uplink connection in order to obtain their assigned gateway server address, which they can use for all subsequent uplink connections (unless changed later by the system). In the event that the gateway cannot connect to its designated gateway server, it can fall back to contacting the default initial gateway in order to refresh its gateway server address.

The predetermined call initiation schedule can be programmable by the server and can provide different intervals for broadband and telephone intervals (e.g., every 30 minutes for broadband and every 90 minutes for telephone).

By assigning the gateway-server communication initiation to the gateway the system can enjoy the following benefits:

1. Most if not all issues generally attributed to routers, firewalls and NAT are eliminated, as the gateway is now simply an HTTP client (much like a web browser).

2. Security against outside hackers is greatly increased as access into the gateway can be disallowed. The gateway knows whom it can talk to (server) and it does so when it needs to.

A possible disadvantage of a push-only scheme can be an inability of the server to provide "real-time" device control. This can be a relatively minor disadvantage minimized through the shoulder-tap mechanism.

Gateway Shoulder Tap

The gateway can have the provision of initiating an uplink communication based on a telephone ring signal detected on the phone line. This shoulder tap from the server allows the server to pass down a variable change to the gateway without having to wait for the next gateway uplink connection.

A drawback of a telephone line shoulder tap is the occasional ringing on the telephone line. It is difficult to detect an incoming ring reliably without the phone actually ringing. This is fairly benign when considering:

1. Most user variable change requests (control) may not have to be done in real-time and can occur at the next scheduled gateway uplink synch.

2. Most often the premises (e.g., home) being controlled in real-time is unoccupied.

3. The shoulder tap can at most ring the phone only once so the user can wait for the second ring before picking up the phone 4. The user can opt to provide a second phone line dedicated to the gateway.

Implementing shoulder tap over IP is another embodiment with a more complicated installation process (e.g., router/firewall configuration, opening ports, etc.). Keeping an IP connection alive between the gateway and server can be unreliable and could heavily burden the server.

Configuration

The gateway can be installed without any special skills. The NOC server can handle the complexity of configuration.

Once plugged into a power outlet as well as a broadband and/or telephone network, the gateway can:

1. Determine if there is a broadband connection available
2. If so, obtain an address from the local DHCP server
3. Make sure the telephone connection is operational
4. Contact the server for the first time and check to see if there is a user account associated with it (this can be a secured inquiry to eliminate hacking)
5. If there is no associated user account found, notify the user (e.g., blinking LED on front panel)

Device Discovery

The gateway can be put into a device discovery mode via, for example, a front panel push button. Devices can normally be introduced to the system and assigned to the user:

1. By system manager before shipping out to the user
2. By the user/installer via the portal device registration screens The discovery mode is a third way of registering devices. The discovery mode allows the gateway to listen for and discover new devices added to the network—should there ever be a need for such functionality. Upon discovery of a new device the information is passed to the server for further processing and registration. The user can then finalize the device registration process through the system's portal (e.g., assigning names, alarming, etc.).

If the user can specify the adding of a device, it can be configured by the user immediately on the portal. Auto-configuration comes with set defaults. Another similar device to copy can be specified.

Auto Recovery

The gateway can be self-sustaining and autonomous.

In the event of communication failure between the gateway and the server for an extended period of time the gateway can continue to do its tasks (e.g., variable monitoring, logging, etc.).

In the event of an extended power loss or a system reset, the gateway can resume normal operation after the appropriate "boot-up" period (i.e., no more than 2-3 minutes). A hardware buffer can receive, e.g., RF signals during bootup.

Any pending scheduled events that did not occur because of the power loss can be performed once the gateway has resumed normal operation and can occur in the original order defined by the user.

In the event that the gateway software "hangs," the gateway can recover itself through a built-in watchdog-monitoring feature.

Rule-Based "Binding"

Gateway Power Interruption

The gateway can operate for at least, e.g., 5 minutes after a power failure in order to report its latest status (including the power status) to the server (either via broadband or telephone). The gateway may not use a rechargeable battery in order to eliminate the need for gateway servicing when the battery reaches the need of its life (e.g., typically 2-3 years).

The gateway can withstand power interruptions without losing any pertinent data (e.g., device data, log data, date & time).

For applications where the gateway and devices are to operate in the absence of power, the user can obtain and use an uninterruptible power supply (UPS).

Remote Firmware Upgrade

The gateway can receive firmware upgrades over its WAN connection (Internet or PSTN). The gateway can have provision for recovery in case there is an interruption during a firmware download (e.g., network connection loss).

The gateway firmware upgrade is an automated process initiated by the gateway based on a schedule downloaded from the server during a gateway-server exchange. The upgrade process may not involve any user interaction or involvement and may take place when the user is least likely to be using the system (e.g., at night).

Variable Logging

The gateway can provide enough storage for logging one day worth of data for, e.g., 10 variables logged every, e.g., 15 minutes. In the event that the local gateway log is filled up before the gateway has had a chance to upload the data to the gateway, the gateway can stop logging additional data and report a "log full" error to the server at the next uplink connection.

Security

Appropriate security measures can be provided by the gateway to ensure protection against:

1. Inadvertent communication with neighboring networks and device's not related to a gateway/user.
2. Intentional external hacking into the system from the WAN side (Internet and PSTN).
3. Intentional external hacking in to the device network side (PL or RF).

Power Consumption

The gateway can use minimal operating power in order to reduce the cost associated with the power supply as well as the circuitry to keep the gateway alive immediately after a power failure.

Form Factor

The gateway can be encased in a visually attractive enclosure that is generic enough for multiple markets including consumer applications and commercial building applications (schools, etc.).

Ease of Use

The gateway can use the simplest possible installation procedure. The gateway can "figure out" how to communicate with the NOC (broadband and/or PSTN) once the power has been connected to it. No user involvement may be necessary for this to take place.

User Interface

The gateway's user interfaces include the following LEDs and switches:

POWER LED

COMM LED: communication happening between gateway and server

DEVICE LED: Device communication (PL or RF) happening. This LED can also be used for the device discovery feature.

ERROR LED: Displays different errors using different blink rates (log error, synch error, comm. error)

SYNCH switch: Initiates a gateway-server uplink communication

Gateway Local Reset

The gateway can provide a way for it to be reset locally by the user. Upon the execution of this gateway reset function, the gateway can be in the factory default state with no device, variable, user or configuration variables residing in it.

The reset operation for the gateway can be performed by, e.g., holding down the SYNCH switch for 20 seconds.

Agency Certifications

The gateway can be designed to comply with both FCC Part 15 (Level B) and Part 68 certifications.

If an external Tamura power supply is not used, then gateway design can meet the standards for the appropriate regional safety agency certification (i.e., UL, CSA, CE, and TÜV).

Error Reporting

The system can report error to the user and/or administrator when the following conditions occur:
1. Downlink variable update failed
2. Gateway synch delayed or missed
3. Missing variable poll value
4. Variable log full
5. Broadband or phone line connection down Server The server provides a hosted, reliable and secure "server-in-the-sky" for the premises gateways to communicate to and for the users (customers) to access for accessing and controlling the various devices in one or more premises.

Reliability

The NOC facility can be run by a managed hosting service and as such provisions for power failure and security (theft) can be in place via the vendor providing the hosting service. However, the NOC server software architecture can support certain backup features.

All user, system, network, gateway and device data contained by the NOC server can be backed up on a regular schedule (e.g., once a day).

When NOC server hardware malfunctions, that hardware can be quickly and easily replaced with minimum user downtime.

Security

The server can communicate to the gateway in a secure fashion.

The data can be encrypted when transferring between the gateway and server, as well as ID/password for authentication.

Scalability

The server software can be scalable such that it can support a large number of gateways over time. The scalability sold also enables the server to have a small foot print at the beginning when the number of gateways may be relatively small.

Platform

The interfaces between the servers and modules can be in XML in order to provide maximum flexibility and scalability. No requirements may be imposed for the operating system or programming language platforms used.

Server API

The server can provide an API (via XML and SOAP) that permits third party applications to get full access to the functionality of the server.

Portal

The portal can support web, WAP and PDA access points. An important attribute of the portal is ease-of-use.

Customization

The portal can present an automatically-customized UI to the user based on the application (e.g., residential, commercial, etc.) and the devices used (e.g., security, energy, safety, etc.).

As a secondary feature the portal can also allow the user to easily customize their portal for their particular needs.

Lastly, system manager personnel or authorized agents can further customize a portal for a specific customer (e.g., a telecom) or class of customers (e.g., homeowners of a home builder). This process can put a specific "skin" on a customer portal.

User Account Screens

These screens allow the end user to open an account and register the end user's gateway(s). Screens can be included for obtaining billing/payment info and other user information (e.g., address, primary contact information, phone number, etc.).

In addition, this can be where the user enters their gateway ID(s) (on the gateways) so the system can make an association between the logical user account and the physical user network(s)/gateway(s).

User notification options (email, phone, page, text messaging, etc.), as well as time zone, uplink interval can also be selected here.

The option to customize the WAP portal interface can be provided so the user can select the variables and the functionalities that are presented on a WAP device accessing the service.

Device Registration Screen

The user can register devices obtained from other sources-assuming they were not pre-registered already by the system manager. The user can enter the unique device ID and the device name, etc.

The ability to delete a device from the local user network can be provided. History related to the device being deleted (log data, action tracking, etc.) can be removed from the system, e.g., 30 days after the device deletion.

The gateway can know if something succeeds or not and report it back to the server. Similarly, each "command" the server performs on the gateway can be tracked back when the results of what the gateway did with it come back (e.g., success, fail, etc.).

The gateway can report the downlink changes like it reports uplink changes. The state change of the variable in question (e.g., Change thermostat setpoint) can appear in the log like any other variable, along with its time stamp.

The portal can set the change, then after the change occurs it can verify it is reported in the log. For example, if the portal is asked to turn the light on, it can be ensured that it happened "once and only once" and if it failed, that can be known.

The ability to replace a device in the local user network can also be provided. Old log data for the replaced device can be kept without a break in the device's data (i.e., the log can start getting values from the new device. Also, since the downlink values are set on the new device, those initial settings can also appear in the log.

Network Configuration Screens

This is where the user configures the device network and sets preferences and options (e.g., which variables to monitor, logging options, etc.).

Provisions for creating variable groupings are also provided here (i.e., defining a single variable that represents the collection of all similar type variables selected by the user— either ANY or ALL function (OR or AND)—e.g., all door/ windows sensor states).

The user selection of which variables are monitored for eventing and alarming is performed here as well.

Normal Usage Screens

These represent the main screens used most often by the user on a day-to-day basis. Typical functionality provided includes: network summary, variable monitoring, variable control, variable logging, system activity log, system status, alarms, etc.

WAP Interface

The portal can also provide a simplified interface for supporting WAP devices. The functionality can be a limited subset of monitoring and control services offered by the web portal.

The customization of the WAP portal interface can be done through the normal Web interface screens PDA interface The portal can also provide a simplified interface for supporting browsers running on PDAs. The functionality can be a limited subset of monitoring and control services offered by the web portal.

The customization of the PDA portal interface can be done through the normal Web interface screens (see above).

Permission Levels

The portal, in association with the server, can provide configurable user access and permission levels for both inter-account (e.g., different premises) and intra-account (e.g., mom, dad & kid) isolation.

Other Features

1. A desktop application in the icon tray that reports alarms and events in the background.
2. Support for larger premises (single user with multiple gateways)
3. Support for multiple users/locations per gateway
4. Rule-based local binding
5. IPSec (e.g., via HiFn chips)
6. Support for LonWorks free topology (FT-10) devices by the gateway Control Network An embodiment of a control network may comprise a collection of sensor and actuator devices that are networked together.

Sensor devices are devices that sense something about their surroundings and report what they sense on the network. Examples of sensor devices are door/window sensors, motion detectors, smoke detectors and remote controls.

Actuator devices are devices that receive commands over the network and then perform some physical action. Actuator devices may include light dimmers, appliance controllers, burglar alarm sirens and cameras. Some actuator devices also act as sensors, in that after they respond to a command, the result of that command is sent back over the network. For example, a light dimmer may return the value that it was set to. A camera returns an image after has been commanded to snap a picture.

The core of an embodiment of a control network is an architecture where sensor devices are coupled to actuator devices. A light switch, for example, may turn on a lamp through a light dimmer actuator. A door/window sensor or smoke detector triggers an alarm. Other devices may also be controlled in various ways.

Figure 6:
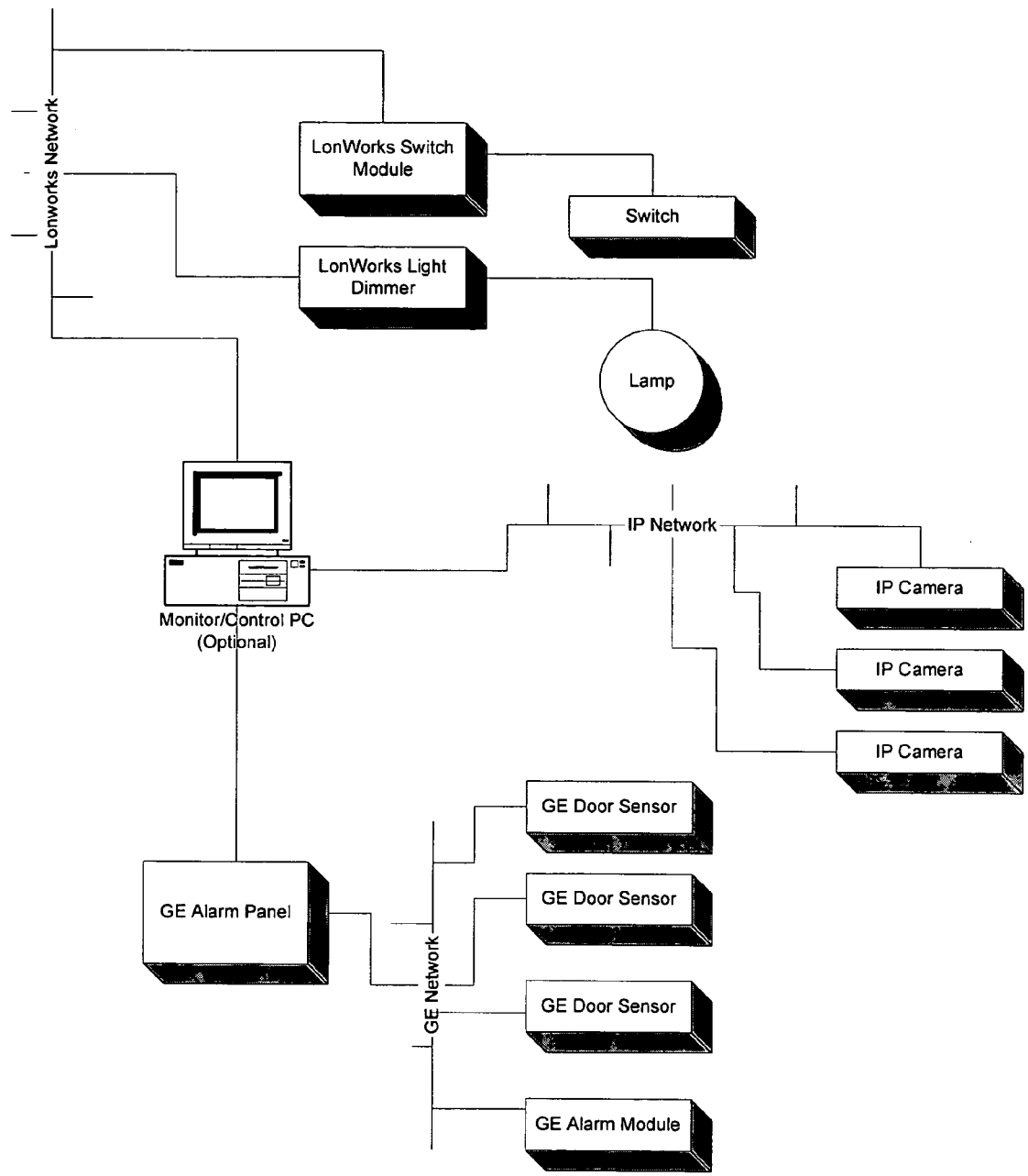
FIG. 6 illustrates an example of a control network environment.

FIG. 6 illustrates an example of a control network environment. Here three different networks with devices are depicted (GE security, LonWorks, IP). The LonWorks network includes a light switch and lamp, the GE network has some door sensors and an alarm controller, and the IP network has some IP cameras attached.

Note that the computer in the middle of the network may be used to bridge the various networks, essentially providing interoperability, but with available existing technologies that calls for a custom solution requiring expensive custom software. Otherwise, the three control networks are independent.

Figure 7:
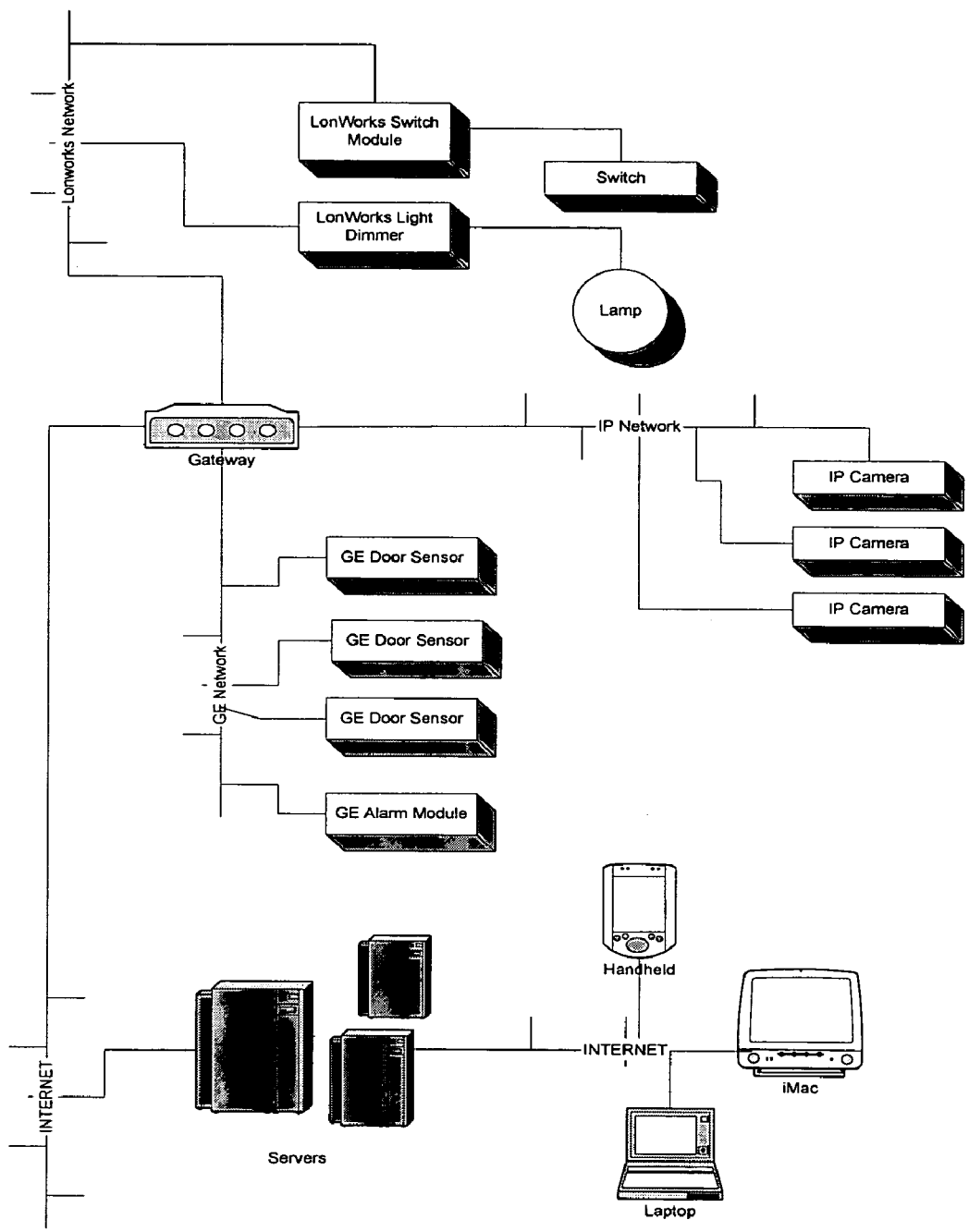
FIG. 7 is a block diagram of a control network with a gateway.

FIG. 7 depicts one embodiment of an architecture that uses these described concepts.

Here we see the same three local networks on the premises (IP, LonWorks, GE Security). However, now they are all connected together by the system gateway. Furthermore, the system gateway is attached to the internet, through which it regularly contacts the system servers in order to send up new data and get back control and configuration information. Clients can monitor and control their premises using ordinary browsers on a wide variety of devices by accessing the system servers.

Note that, at the premises, use of a PC or custom programming to achieve interoperability between different device technologies, or to provide remote monitoring and control may be avoided. Instead, in an embodiment both functions are performed by the system gateway, which according to an embodiment is designed to interface to a variety of device technologies and provide an abstraction layer that helps the rest of the system (servers and clients) to be technology-neutral.

Sensor/Actuator Device Abstraction

Sensor and actuator devices are abstracted at the gateway hardware level so that different devices from different manufacturers can be handled seamlessly. Embodiments may support devices from several different manufacturers (for example, GE Security, Axis Communications, Axsys Systems) using three different communications technologies (unlicensed-band RF for GE devices, Internet Protocol for IP cameras, and powerline for LonWorks modules).

Gateway Device

The gateway device performs the hardware abstraction function according to an embodiment of the invention. The gateway includes the hardware and software required to communicate with all supported device technologies. Software on the gateway converts the raw data received from the device to an indexed data point. Periodically the gateway sends the data to the server, with each datum tagged with its data point index and time stamp.

In an embodiment, the server performs substantial operations for data storage and user interface.

Gateway—Server Data Interface

Between the server and the gateway, an embodiment of the system uses a device-property-value model. Each device supports some number of properties that expose its capabilities. For example, an embodiment of a door sensor has a state property (open or close) and a battery-level property (low or ok). Both the devices and their properties are given indexes when the gateway is configured, and all subsequent data exchange uses the indexes to identify the property involved. This indexed property ID may also be referred to as an "indexed data point."

Figure 8:
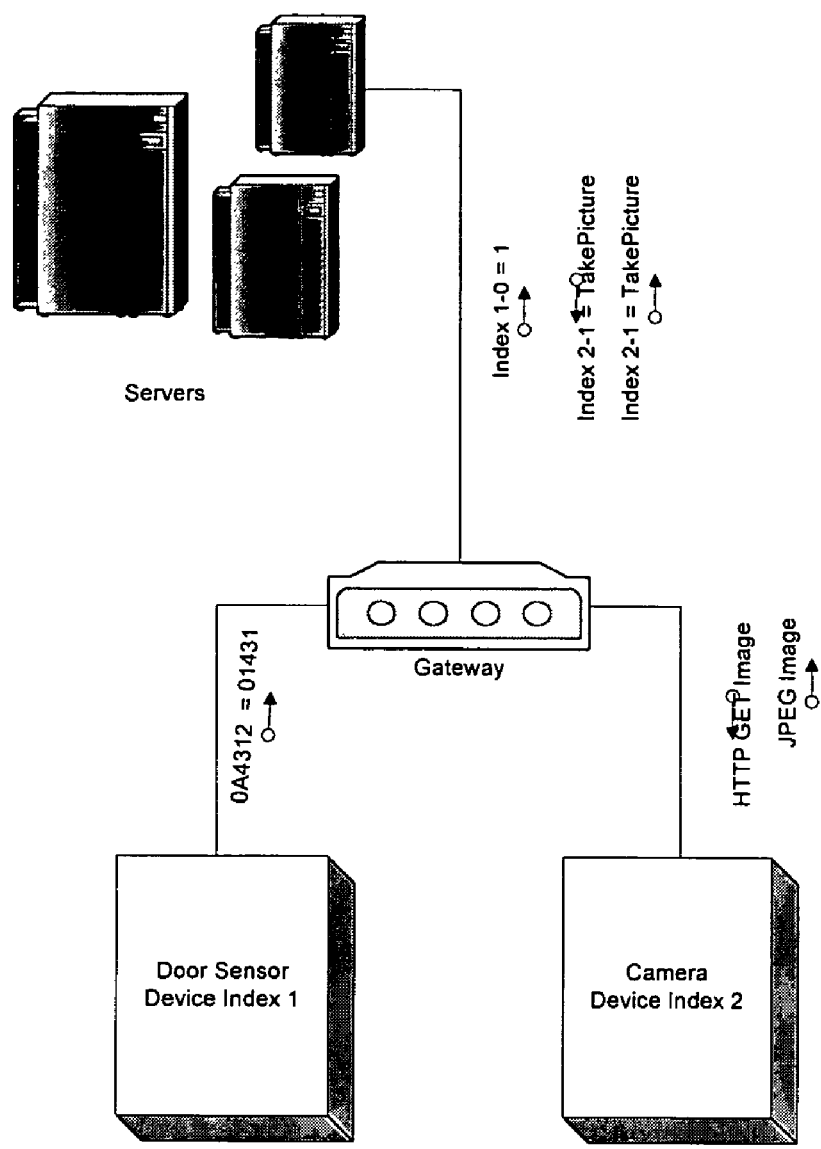
FIG. 8 is a flow diagram showing data being transformed, physically and logically, by a gateway.

FIG. 8 illustrates how data is transformed, physically and logically, by the gateway.

The door sensor has detected an open door, and sends the gateway a message with its hardware ID and raw value. The gateway interprets the data, converts it to an indexed data point value, and sends it to the server as device #1, property #0, set to 1 (true). Note that the device ID is converted to the configured device index (1), and the changed property is identified by its property index (0).

In the second case, the client wants to take a picture, so the server sends down the value (in this case, the desired picture name) indexed by the camera's device index (2) and the camera's picture property's index (1). In this case, the gateway initiates a web service to the camera to access (and upload) the image, then sends back the result of that operation to the server, again as an indexed data point.

According to an embodiment, the camera and a door sensor are both handled identically by the server and in the server-gateway protocol, using the device+property model.

Common Device Definition Format

In the server infrastructure, the device data is handled as indexed data point values. When the data is presented to the user, it is reinterpreted. The device definition file is the mechanism that permits the server software to handle this reinterpretation with a single, common code module, independent of device types or technologies.

Physical devices are defined using a common device definition file format which provides the information necessary to convert the device- and technology-specific view of a device to an abstracted, generalized view.

Function Types and Properties Abstraction

In order to allow client inspection and manipulation of sensor/actuator devices in a device- and technology-independent manner, device capabilities are mapped to standard function types, each of which defines one or more standard properties. This permits client software to, for example, query the system for temperature measurements, without necessarily knowing what physical device type provided it or what networking technology it used.

Raw Data Types

Each property in a device definition is tagged with its raw data type. This is the format of the raw data as received from the device and passed up by the gateway. Note that this is usually not the same format as the raw data that is passed from the device to the gateway.

For Boolean (digital) properties, this raw value is either the string "1" or the string "0." For analog properties, the format of the value can vary widely depending on the type of device. The gateway does not have to be responsible for handling the wide variety of formats possible, since the raw format type is stored in the device type definition, and is used by the server to make the conversion when necessary.

Standard Data Types

Each property in the device definition file is further tagged with a standard data type. This is the type that is stored in the server database and, by default, reported to the client. (Note that the actual database field type is a string: the "standard type", as used here, refers to how that string is formatted, not to the database data type).

Formatter Conversion Classes

The server has a set of formatter classes that convert between the raw and standard formats. These are selected and instantiated dynamically, as needed, based on the raw and standard data type strings from the device definition. This way the server code that manages data is identical for all data types, and supporting a new data type includes creation of a new formatter conversion class. Similarly, there are a set of formatter classes that convert between different standard formats.

Data Conversion Data Flow

Figure 9:
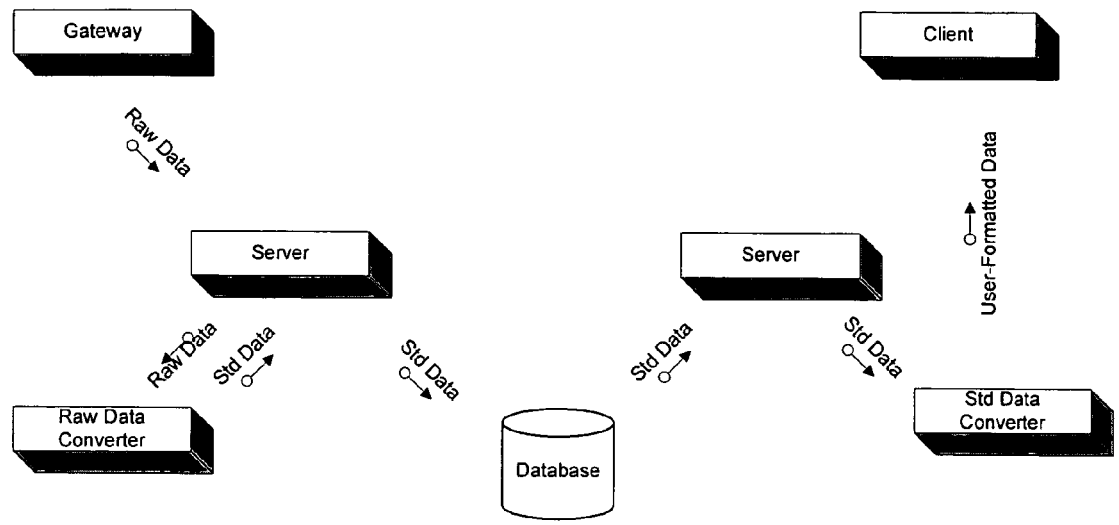
FIG. 9 is a flow diagram showing the data conversion.

FIG. 9 illustrates how the data conversion is handled. Raw data is sent up by the gateway. The server uses the device definition to determine which raw data converter to invoke, calls the converter, and stores the standard data in the database. Later, when the data is read, the server accesses the standard data from the database, optionally reformats it to the client's specifications, then returns the formatted value to the client.

Associative Binding

Binding is the process of "connecting" the output of one device (a sensor) to another device (actuator). An example is a switch that triggers a light to go on.

Gateway Binding

First, whether the devices in question use the same technology or not, associative binding uses the gateway itself as the "connection" mechanism. The gateway receives the signals from the sensor, interprets them, and relays the appropriate message to the actuator.

Gateway binding can be implemented without associative binding. That may, however, involve the gateway containing code to do the data conversion from the source device's data format to the destination device's data format. For example, if a switch is bound to a lamp controller, switching the switch to on causes the lamp to turn on.

Associative Binding

The gateway implements a form of associative binding, where a binding (connection) is triggered by the value of a source device property. Bindings are kept in a table that maps source device properties+values to destination device properties+values. For example, consider a remote control that sends out a numeric value (for example, 1 to 10). Binding entries can map the individual values to different target devices, so that each value can turn on a different lamp. Furthermore, the binding entries contain the specific values that need to be sent to the target device property.

Each associative binding defined on the gateway may include:

Index of the source device property
Index of the target device property
Source property value
Destination property value When a sensor's bound data point reports a change, the gateway checks whether there are any bindings that match that data value. If there are, it sends the appropriate destination data to the destination device property, hence to the destination device hardware.

Figure 10:
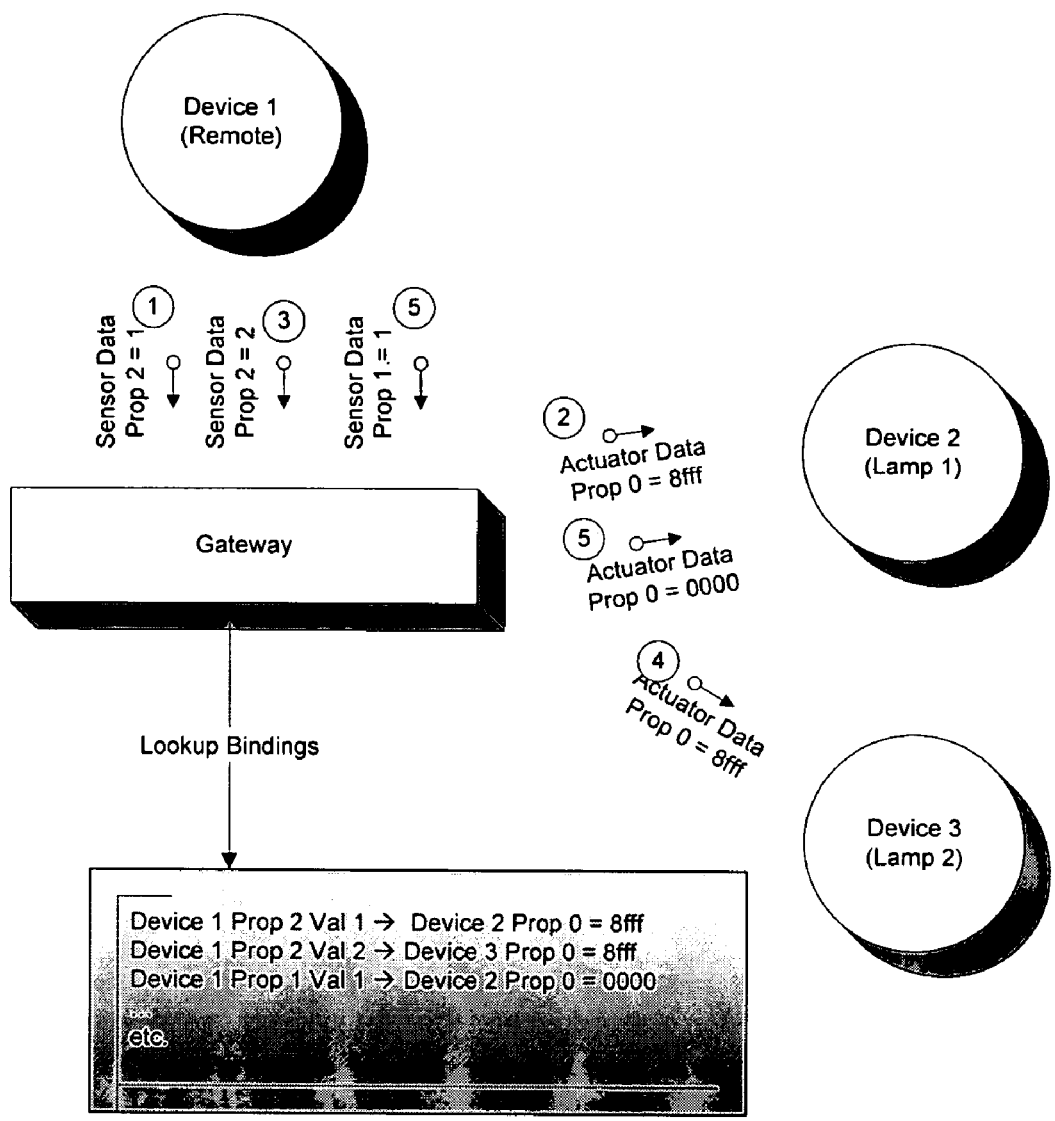
FIG. 10 is a diagram showing a gateway binding mechanism.

FIG. 10 illustrates a gateway binding mechanism. The steps illustrated in the diagram are:

1. User presses on-1 button, remote sends "prop 2=1"
2. Gateway finds "prop2=1" in table, sends "prop 0=8fff" to Device 2 prop 0
3. User presses on-2 button, remote sends "prop 2=2"
4. Gateway finds "prop2=2" in table, sends "prop 0=8fff" to Device 3 prop 0
5. User presses off-1 button, remote sends "prop 1=1"
6. Gateway finds "prop1=1" in table, sends "prop 0=0000" to Device 2 prop 0

Gateway Data Abstraction

The source and destination data are specified in the table as untyped strings, so the gateway can do a string comparison, which may not involve knowledge of the data semantics. The gateway passes the destination string back to the destination device, again without necessarily using semantic knowledge.

User Data Abstraction

In an embodiment of the system, the user knows the semantics of the data, but may not know the raw data formats. So the user knows that "when I press the lamp on button on my remote, I want the lamp to go to full brightness." Because the data from both the sensor and the actuator involved in a binding is normalized to standard data units, the user can specify their desired bindings using those standard data formats, and the system receives these selections. (In the above case, Remote "lamp" button="On" causes the Lamp to be set to "100%").

Server Data Abstraction

As in cases where the server handles sensor/actuator data, it does so in the case of bindings using the format conversion classes, driven by the device definition files. The server does not necessarily use semantic knowledge of the values being bound.

Gateway Device Abstraction

For a given user premises, in addition to the sensor and actuator data, there is system-level data that is managed. Some examples are error logs, usage logs, gateway error alerts, tracking changes to the system, etc. The gateway may be treated as a pseudo device.

In this design, system data are reported as properties belonging to the gateway pseudo device. Because the system properties are exposed this way, they can be transparently handled by the server infrastructure (logging, reporting, etc.) rather than requiring a separate logging/reporting mechanism. This enhances the resiliency of the server design, since new system properties can be added without changing the server code (simply adding the new system variables to the gateway device model suffices).

Camera Snapshot: Abstracting Images through Properties

The data from cameras (i.e., "camera" function types) is a relatively large binary file. An embodiment of this does not fit the simple property-value model, and in an embodiment the image is not represented by a string. An embodiment handles the cameras and camera properties like other devices where it is appropriate, yet still offers the camera features (still images and video) to the user. An embodiment does that by creating special properties for the camera.

Cameras contain a property named "snapshot" that is linked to the camera's images. This property performs: 1) writing to this property causes the camera to take a snapshot and upload it to the server, and 2) the property is logged when the property changes. The value of the property is the name of the snapshot image. That is used by the server to fetch an image given a name.

Taking a Snapshot

Clients write a string value to the snapshot property that gets sent down to the gateway. That causes the camera code in the gateway to get the snapshot from the camera and upload it to the server. Finally, it reports (to the server) that the property was successfully updated. While the gateway does require special code to handle the camera interface, the device property data is handled exactly like any other device property.

Figure 11:
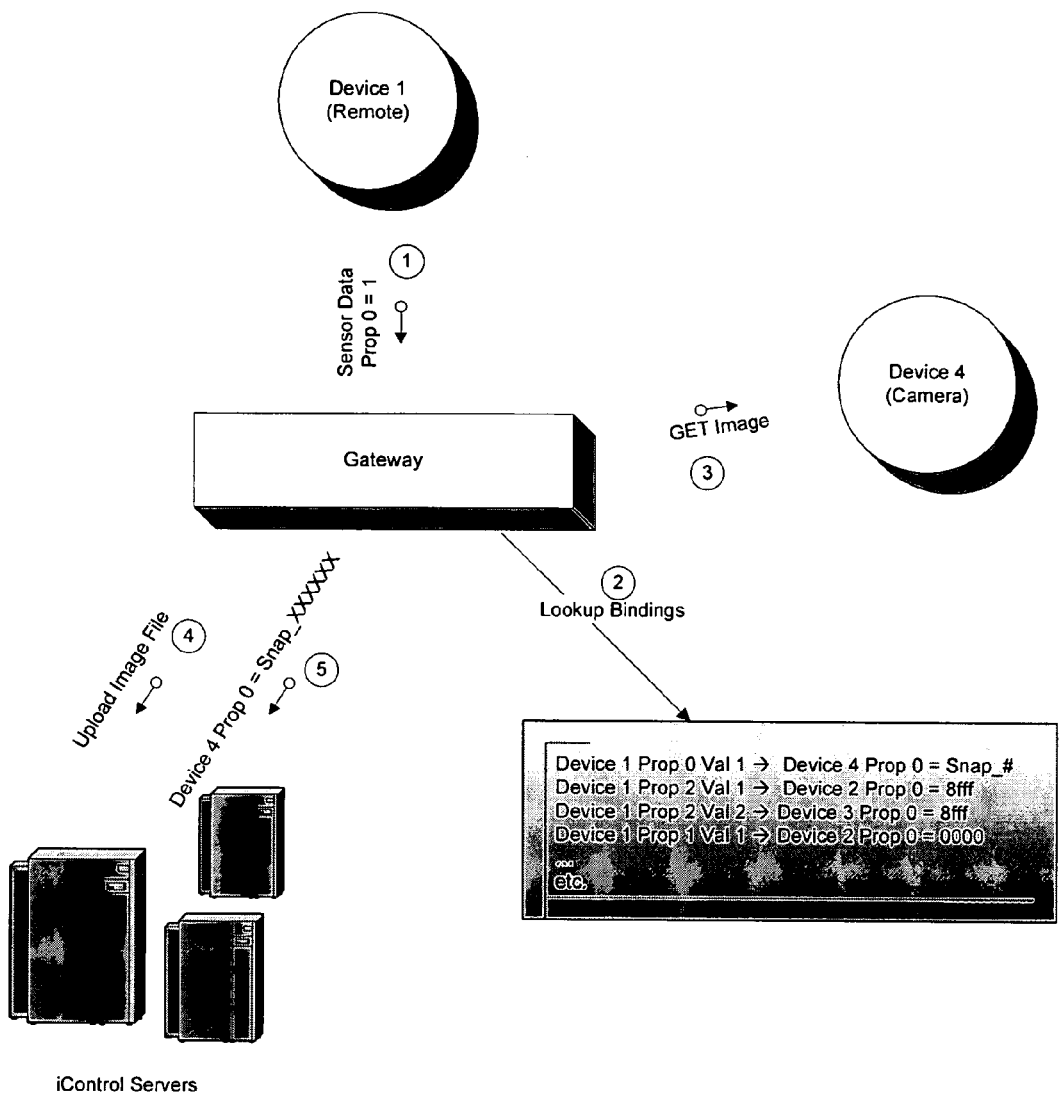
FIG. 11 is a diagram showing a camera snapshot scenario.

FIG. 11 illustrates a camera snapshot scenario.

Logging Images

By using a regular property to represent an image snapshot, the times, names, etc. of the snapshots can be logged using the ordinary property logging mechanisms used for other properties. The client software uses this history log to display thumbnails of the saved images. As in the case of the server, the client software does not need special code to get the list of images (although it does use special code to display the thumbnails and images according to an embodiment).

Binding Snapshots

Because a snapshot is triggered by a property assignment, that assignment can also occur due to a binding. Thus combining this snapshot property functionality with the associative binding capability leads to a way to take snapshots based on reported sensor data.

FIG. 11 illustrates a camera snapshot binding mechanism. The steps depicted are:

1. User presses "take picture" button on remote, remote sends "Device 1 Prop 0=1"
2. Gateway finds the binding in the table (Dev 4 Prop 0=Snap_#)
3. The # at the end tells the camera code to append a random number
4. Gateway camera code gets the data update, initiates an HTTP GET to the camera
5. Gateway camera code sends the image to the server
6. Gateway reports updated data like any other data update.

Camera Integration

Embodiments of the server and gateway incorporate a number of features that simplify the installation and use of still and video cameras.

Camera Type Abstraction

As is the case for attached devices, cameras are abstracted on the gateway so that neither the client nor the server infrastructure necessarily has specific knowledge of the camera type, thus they may handle all cameras identically according to an embodiment. (Note: the client application—in our case the portal—may use some specific camera knowledge in order to present the video and stills transparently to the user).

Integrated Stills and Video

The camera stills and video are integrated into the user interface so that the user never sees any camera-specific web pages. FIG. 12 illustrates a camera environment.

Firewall-Proof Still Images

According to an embodiment, the images from the IP-attached cameras supported are not viewed from beyond the user's own local network unless the user's router opens a port and forwards the camera requests to the camera. However, since the gateway is behind the same firewall as the camera, it gets the image from the camera and transfers it to the server via HTTP port 80 (which is always open). The images thus become available to the user on the Internet (protected by username/password).

Integrated Video Dynamic DNS Replacement

Viewing video from the camera involves the client changing router settings to forward TCP requests to their camera. Then, the portal allows the client to access the video without the client necessarily knowing the Internet address of the client's system. The gateway is in regular communication with the server, and upon update the server saves the gateway's current WAN address. When the client wants to see video from the client's camera, the server inserts the gateway's WAN address into the video image link (href). If the user's IP address changes frequently, the user can access their camera's video from anywhere.

Installation

Network cameras on the market come with a variety of installation methods. An embodiment of the gateway eliminates the need for client involvement by automatically configuring the camera hardware.

During the camera configuration, the gateway creates private administrator password, then a view-only user with a random password that is subsequently used to get camera images (still or video). The gateway searches for the camera on the local network to obtain its IP address (as assigned by the user's router). Since the gateway itself is automatically configured via DHCP, it knows the subnet and approximate address range that the router is using for the DHCP-assigned addresses.

Configuration

According to an embodiment, the camera configuration capability is exposed via camera configuration properties. Should the user want to change the camera's address or client user name/password, the user can do so in one place, on the system portal. The changes are passed down to the gateway (as camera configuration property updates) where it causes the gateway to reconfigure the camera hardware. Differences between different camera types are handled by the gateway software. These properties are handled and logged as other properties.

Router Port Forwarding Assistance

Setting a router's port forwarding table to support remote video viewing may involve:

1. Determine that port forwarding is called for
2. Find the router's configuration web page
3. Figure out what to enter as the server address
4. Figure out what to enter as the server port
5. Know what to put where
6. Know if it is working correctly An embodiment of the system addresses these items. Note that the user is logged on from the user's own network (the "Local Client" example in FIG. 12) to configure the user's router.

Determining Port Forwarding is Desired

When the user accesses a camera from the system portal, the system server performs a test to check whether the camera is accessible from the Internet. If it is, the camera page includes a link to a page that will display the video. If the camera is not accessible, the video link instead opens a camera assistance page that guides the user through steps to configure their router's port forwarding.

Finding the Router's Web Page

Since the gateway is on the same internal network as the camera, it knows what the router's address is (it is the default gateway passed back in the DHCP assignment). The portal generates a link on the camera assistance page that takes the user right to the user's router's configuration web page.

Address, Port and Where to Put Them

Since the camera's address and port are available via properties, the portal reads these properties and includes these properties in descriptive text on the camera assistance page. That page also contains a link to a router help page, where the user can select the user's router and get specific help on what to do to configure it.

Device Test

The camera assistance page has a button to test whether the port forwarding is a success or not. It uses the server's test-camera-access API to make the determination, and displays either a pass or fail message to let the user know.

Various Embodiments

In addition to the foregoing, the following are various examples of embodiments of the invention.

Some embodiments of a method for premises management networking include monitoring premises management devices connected to a gateway at a premises; controlling premises management devices connected to the gateway at the premises; receiving, at the premises, an uplink-initiation signal associated with a network operations center server; and in response to the uplink-initiation signal, initiating, from the gateway at the premises, communications between the gateway and the network operations center server; and communicating, during the communications between the gateway and the network operations center server, information associated with the premises management devices.

The uplink-initiation signal can be received via telephone and/or broadband connection. The gateway can initiate communications between the gateway and the network operations center server with at least an HTTP message and/or at least an XML message. The premises management devices can manage energy of the premises, security of the premises, and/or safety of the premises. Many embodiments provide a hosted solution for property developers, owners and managers as well as service providers (ISPs, telcos, utilities, etc.) such as communication service providers and Internet portal providers. Some embodiments offer a complete, turnkey, reliable, and/or cost-effective solution for the delivery of telemetry services (e.g., energy management, security, safety, access, health monitoring, messaging, etc.) to customers.

An embodiment of the invention is directed to a business method for premises management. Some embodiments of a business method for premises management include making an Internet portal available for access to a vendee, such as a premises vendee, communication service vendee, and/or an Internet portal vendee; and at least after a transaction between the vendor and the vendee, such as a premises transaction, a communication services transaction, and/or Internet portal services transaction, providing premises management services via the Internet portal to the vendee.

The Internet portal can be branded with a brand of the vendor according to an embodiment. Examples of a premises vendor include a home builder, premises builder, and premises manager. Examples of a premises vendee include a home buyer, premises buyer, and premises tenant. Examples of a communication service vendor include an Internet service provider, a telephone company, a satellite television company, and a cable television company. Examples of a communication service vendee include a customer of the Internet service provider, a customer of the telephone company, a customer of the satellite television company, and a customer of the cable television company. Premises management services can manage energy of the premises, security of the premises, and/or safety of the premises.

An embodiment of the invention is directed to a system. The system includes a network of premises management devices, a gateway coupled to the network and premises management devices, a server coupled to the gateway by a communication medium and a portal coupled to the communications medium. The portal provides communication with the premises management devices.

According to various embodiments in the invention alone or in various combinations: the communications medium may comprise the Internet; the portal may comprise an internet portal; and/or the portal may be branded with the name of a vendor of a product associated with the premises. The product may comprise a building, and/or the vendor may comprise a party that leases the premises. The vendor may also or alternatively comprise a property management organization. The server may be included within a network operations center. The logic may comprise, according to various embodiments of the invention, software, hardware, or a combination of software and hardware.

Another embodiment to the invention is directed to a gateway. The gateway includes an interface coupled to a network of premises management devices, logic that receives data from different premises management devices, and an interface coupled to a communications medium that is coupled to a server. The server is coupled to a portal coupled to the communications medium. The portal provides communications with the premises management devices.

According to various embodiments of the invention alone or in various combinations: the communications medium may comprise the Internet; the portal may comprise an internet to portal; and/or the portal may be branded with the name of a vendor of a product associated with the premises. The product may comprise a building; the vendor may comprise a party that leases the premises; the vendor may comprise a property management organization; and/or the server may be included within a network operations center.

Another embodiment of the invention is directed to premises management system. The premises management system includes a network of premises management devices and a gateway coupled to the network of premises management devices. The gateway includes logic that receives data from different premises management devices and an interface coupled to a communications medium that is coupled to a server. The server is coupled to a portal coupled to the communications medium, and the portal provides communication with the premises management devices. The logic may comprise, according to various embodiments of the invention, software, hardware, or a combination of software and hardware.

Another embodiment of the invention is directed to a system that includes: a network of premises management devices; a gateway coupled to the network of premises management devices; a server coupled to the gateway by a communications medium and a portal coupled to the communications medium, the portal providing communication with the premises management devices.

According to various embodiments in the invention, alone, or in various combinations: the common format includes a set of properties for each type of device; the format includes an index for each device and an index for each property of each device; the network comprises a network operations center; the network of premises management devices includes at least a camera; the system includes logic that reinterprets abstracted data in the common format from the different premises management devices; the server includes a device definition file for reinterpreting the abstracted data; the system includes a set of standard function types that define standard properties; the standard properties include temperature; the system includes client software that queries measurements corresponding to the respective property without specifying the type of device from which the measurement is to be received; the server includes a set of formatter classes that convert between the format of data in which data is passed from the gateway to the server in a type in which the data is stored in the server; the formatter classes are instantiated dynamically; the system includes device definitions for respective premises management devices; and/or the server is included within a network operations center.

An embodiment of the invention is directed to a gateway that includes: an interface coupled to a network of premises management devices; logic that abstracts data from different premises management devices using a common format; and an interface coupled to a communications medium that is coupled to a server. The server is coupled to a portal coupled to the communications medium, and the portal provides communication with the premises management devices. The gateway may include logic to interact with various aspects of the various systems described herein.

Another embodiment in the invention is directed to a gateway that includes: an interface coupled to a network of premises management devices, the network including at least a first device comprising a source of data and at least a second device comprising a recipient of the data; logic that abstracts data from different premises management devices using a common format; logic that maps data from a first device least comprising the source of data to data on a second device comprising the recipient of the data; and an interface coupled to a communications medium that is coupled to a server, wherein the server is coupled to a portal coupled to the communications medium, the portal providing communication with the premises management devices.

According to various embodiments of the invention, in various combinations or alternatively: the mapping is based on a property of the first device and a corresponding property of the second device; the mapping is stored in a table in the server; the mapping is based on a correspondence between an index of a property of the first device with an index of a property of the second device; gateway includes logic that checks whether there are any corresponding properties on a corresponding device that comprises a recipient of data if corresponding data from a device that comprises a source of the corresponding data changes; and/or the logic comprises hardware, software, or a combination of hardware and software.

Another embodiment of the invention is directed to a system that includes: a set of one or more premises management devices, the set of one or more premises management devices including at least a camera; a gateway coupled to the set of one or more network of premises management devices, the gateway including logic that abstracts data from a premises management device using a common format, general to different devices; a server coupled to the gateway by a communications medium; and a portal coupled to the communications medium, the portal providing communication with at least a device in the set of one or more premises management devices.

According to various embodiments of the invention, alternatively, or in various combinations: the system includes logic that transmits data from the gateway to the server using HTTP protocol; the data from the gateway includes an image from the camera; the gateway includes logic that pushes data to the server from the set of one or more premises management devices; the system includes logic that causes an image from the camera served from the server to be displayed; the system includes logic that causes an image from the camera to be transmitted from the gateway to the server in response to an uplink-initiation signal; the uplink communication signal is received via telephone; the uplink communication signal is received via telephone without requiring answering of a telephone call; the uplink communication signal is received via broadband connection; at least a device in the set of one or more network of premises management devices manages energy of the premises; at least a device in the set of one or more network of premises management devices manages security of the premises; at least a device in the set of one or more network of premises management devices manages safety of the premises; the camera includes at least a property specific to a camera and at least a property common with at least another type of device; the property specific to a camera causes the camera to take a picture; the property specific to a camera causes a picture taken by the camera to be uploaded to the server; the system includes logic that causes a picture to be taken based on the state of another device in the set of one or more premises management devices; another device in the set comprises a motion sensor; the system includes the plurality of different types of cameras and wherein the gateway includes logic that abstracts data from the different types of cameras into a common format for delivery to the server; the system includes a router that couples the gateway to the communications medium; the camera comprises an internet protocol (IP) camera; and images from the camera are provided over the communications medium only if the gateway initiates a transfer of the image to the server.

Another embodiment of the invention is directed to a system that includes: a set of one or more premises management devices, the set of one or more premises management devices including at least a camera; a gateway coupled to the set of one or more network of premises management devices; a server coupled to the gateway by a communications medium, and a portal coupled to the communications medium, the portal providing communication with at least a device in the set of one or more premises management devices. The gateway includes logic that pushes data from the set of one or more premises management devices to the server.

According to various embodiments of the invention, alternatively, or in various combinations: the gateway does not allow direct access to the set of one or more premises. management devices from the communications medium; the system includes logic that causes an image from the camera to be transmitted from the gateway to the server in response to an uplink-initiation signal; the uplink communication signal is received via telephone; the uplink communication signal is received via telephone without requiring answering of a telephone call; the uplink communication signal is received via broadband connection; at least a device in the set of one or more network of premises management devices manages security of the premises; the camera includes at least a property specific to a camera and at least a property common with at least another type of device; the property specific to a camera causes the camera to take a picture; the system includes logic that causes a picture to be taken based on the state of another device in the set of one or more premises management devices; the system includes a plurality of different types of cameras and the gateway includes logic that abstracts data from the different types of cameras into a common format for delivery to the server; and/or the camera comprises an internet protocol (IP) camera.

Another embodiment of the invention is directed to a gateway that includes: an interface coupled to a set of one or more premises management devices, the set of one or more premises management devices including at least a camera; and an interface coupled to a communications medium that is coupled to a server, wherein the server is coupled to a portal coupled to the communications medium, the portal providing communication with the premises management devices; and logic that pushes data from one or more premises management devices to the server.

Components of the gateway, server, system and/or other aspects described above include any collection of computing components and devices operating together. Components of these items can also be components of subsystems or within a larger computer system or network. The components can also be coupled among any number of components (not shown), for example other buses, controllers, memory devices and data input/output (IO) devices in any number of combinations. Further common components of these items can be distributed among various numbers or combinations of other processor-based components according to various embodiments of the invention.

Aspects of the gateway, server, system and other items described here and may be implemented as functionality programmed into any variety of circuitry, including programmable logic devices, (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects these items include: microcontrollers with memory (such as electronically erasable programmable read only memory (EEPROM)), embedded microprocessors, firmware, software, etc. Furthermore, aspects of the gateway, server and other elements may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

The various functions or processes disclosed herein may be described as data and/or instructions embodied in various non-transitory computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.). When received within a computer system via one or more computer-readable media, such data and/or instruction-based expressions of components and/or processes under the ICS may be processed by a processing entity (e.g., one or more processors) within the computer system in conjunction with execution of one or more other computer programs.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of illustrated embodiments of the system is not intended to be exhaustive or to limit the system to the precise form disclosed. While specific embodiments of, and examples for, the system are described herein for illustrative purposes, various equivalent modifications are possible within the scope of the system, as those skilled in the relevant art will recognize. The teachings of the system provided herein can be applied to other processing systems and methods, not only for the systems and methods described above.

The elements and acts of the various embodiments described above can be combined to provide further embodiments. These and other changes can be made to the system in light of the above detailed description.

In general, in the following claims, the terms used should not be construed to limit the system to the specific embodiments disclosed in the specification and the claims, but should be construed to include all processing systems that operate under the claims. Accordingly, the system is not limited by the disclosure, but instead the scope of the system is to be determined entirely by the claims.

While certain aspects of the system are presented below in certain claim forms, the inventors contemplate the various aspects of the system in any number of claim forms. For example, while only one aspect of the system is recited as embodied in machine-readable medium, other aspects may likewise be embodied in machine-readable medium. Accordingly, the inventors reserve the right to add additional claims after filing the application to pursue such additional claim forms for other aspects of the system.

What is claimed is:

1. A method for premises management networking of a premises management system, the method comprising:
   monitoring premises management devices connected to a gateway at a premises, wherein the premises management devices form a plurality of networks, wherein each network of the plurality of networks comprises a plurality of premises management devices forming an autonomous network that is separate and distinct from any other network of the plurality of networks;
   controlling the premises management devices, the controlling comprising the gateway selectively forming and controlling an associative binding between the plurality of networks;
   obtaining an assigned server address, and using the assigned server address for all subsequent uplink connections unless the assigned server address is changed later by the system;
   initiating, by the gateway, all communications with a network operations center server using the assigned server address; and
   communicating, during the communications between the gateway and the network operations center server, information associated with the premises management devices, wherein the assigned server address is an address associated with the network operations center server.

2. The method of claim 1, wherein the uplink-initiation signal is received via telephone.

3. The method of claim 1, wherein the uplink-initiation signal is received via broadband connection.

4. The method of claim 1, wherein the gateway initiates communications between the gateway and the network operations center server with at least an HTTP message.

5. The method of claim 1, wherein the gateway initiates communications between the gateway and the network operations center server with at least an XML message.

6. The method of claim 1, wherein the premises management devices manage energy of the premises.

7. The method of claim 1, wherein the premises management devices manage security of the premises.

8. The method of claim 1, wherein the premises management devices manage safety of the premises.

9. The method of claim 1, wherein the plurality of networks includes a security network and an Internet Protocol (IP) device network.

10. The method of claim 1, wherein the plurality of networks includes a security network and an energy control network.

11. The method of claim 1, wherein the plurality of networks includes an Internet Protocol (IP) device network and an energy control network.

12. The method of claim 1, wherein the plurality of networks includes a security network, an Internet Protocol (IP) network, and an energy control network.

13. The method of claim 1, wherein the plurality of networks includes a legacy security system, wherein the gateway is connected to a controller of the legacy security system.

14. A premises management networking gateway of a premises management system, the gateway including a computer readable medium having data, instructions or a combination thereof for managing a premises network, comprising:
   non-transitory computer readable medium having data, instructions or a combination thereof for monitoring premises management devices connected to the gateway at a premises, wherein the premises management devices form a plurality of networks, wherein each network of the plurality of networks comprises a plurality of premises management devices forming an autonomous network that is separate and distinct from any other network of the plurality of networks;
   non-transitory computer readable medium having data, instructions or a combination thereof for controlling the premises management devices, the controlling comprising the gateway selectively forming and controlling an associative binding between the plurality of networks;
   non-transitory computer readable medium having data, instructions or a combination thereof for obtaining an assigned server address, and using the assigned server address for all subsequent uplink connections unless the assigned server address is changed later by the system;
   non-transitory computer readable medium having data, instructions or a combination thereof for initiating, by the gateway, all communications with a network operations center server using the assigned server address; and
   non-transitory computer readable medium having data, instructions or a combination thereof for communicating, during the communications between the gateway and the network operations center server, information associated with the premises management devices, wherein the assigned server address is an address associated with the network operations center server.

15. The premises management networking gateway of claim 14, wherein the uplink-initiation signal is received via telephone.

16. The premises management networking gateway of claim 14, wherein the uplink-initiation signal is received via broadband connection.

17. The premises management networking gateway of claim 14, wherein the gateway initiates communications between the gateway and the network operations center server with at least an HTTP message.

18. The premises management networking gateway of claim 14, wherein the gateway initiates communications between the gateway and the network operations center server with at least an XML message.

19. The premises management networking gateway of claim 14, wherein the premises management devices manage energy of the premises.

20. The premises management networking gateway of claim 14, wherein the premises management devices manage security of the premises.

21. The premises management networking gateway of claim 14, wherein the premises management devices manage safety of the premises.

22. The premises management networking gateway of claim 14, wherein the plurality of networks includes a security network and an Internet Protocol (IP) device network.

23. The premises management networking gateway of claim 9, wherein the plurality of networks includes a security network and an energy control network.

24. The premises management networking gateway of claim 14, wherein the plurality of networks includes an Internet Protocol (IP) device network and an energy control network.

25. The premises management networking gateway of claim 14, wherein the plurality of networks includes a security network, an Internet Protocol (IP) network, and an energy control network.

* * * * *